(12) United States Patent
Kumagai et al.

(10) Patent No.: US 11,579,615 B2
(45) Date of Patent: Feb. 14, 2023

(54) REMOTE CONTROL APPARATUS, SYSTEM, METHOD, AND PROGRAM

(71) Applicant: NEC Corporation, Tokyo (JP)

(72) Inventors: Taichi Kumagai, Tokyo (JP); Hiroshi Yoshida, Tokyo (JP)

(73) Assignee: NEC CORPORATION, Tokyo (JP)

( * ) Notice: Subject to any disclaimer, the term of this patent is extended or adjusted under 35 U.S.C. 154(b) by 351 days.

(21) Appl. No.: 16/761,346

(22) PCT Filed: Nov. 7, 2018

(86) PCT No.: PCT/JP2018/041339
§ 371 (c)(1),
(2) Date: May 4, 2020

(87) PCT Pub. No.: WO2019/093374
PCT Pub. Date: May 16, 2019

(65) Prior Publication Data
US 2021/0181751 A1 Jun. 17, 2021

(30) Foreign Application Priority Data
Nov. 8, 2017 (JP) .................................. 2017-215744

(51) Int. Cl.
*G05D 1/02* (2020.01)
*G05D 1/00* (2006.01)

(52) U.S. Cl.
CPC ......... *G05D 1/0214* (2013.01); *G05D 1/0022* (2013.01); *G05D 1/0223* (2013.01); *G05D 1/0246* (2013.01); *G05D 1/0274* (2013.01)

(58) Field of Classification Search
CPC ........... G06T 1/00; G06T 1/0014; G01S 1/08; G01S 3/781; G01S 3/782; G01C 221/00;
(Continued)

(56) References Cited

U.S. PATENT DOCUMENTS

2007/0282531 A1 12/2007 Park et al.
2010/0235033 A1 9/2010 Yamamoto et al.
(Continued)

FOREIGN PATENT DOCUMENTS

JP H06-133310 A 5/1994
JP H08-36691 A 2/1996
(Continued)

OTHER PUBLICATIONS

International Search Report for PCT Application No. PCT/JP2018/041339, dated Feb. 5, 2019.

*Primary Examiner* — Anthony R Jimenez
(74) *Attorney, Agent, or Firm* — Sughrue Mion, PLLC

(57) ABSTRACT

A remote control apparatus performs: calculating a path and a moving speed to reach a desired destination from a current position of the control target apparatus; measuring a communication delay time between the remote control apparatus and the control target apparatus; estimating an overshoot region based on the communication delay time, a stored size of the control target apparatus, and the moving speed; predicting whether the control target apparatus will contact with a peripheral object(s), based on the path, the overshoot region, and stored peripheral object information of the control target apparatus; calculating the moving speed information to be given to the control target apparatus so that a moving direction of the control target apparatus changes by a predetermined value or more when predicted that the control target apparatus will contact with a peripheral object(s); and transmitting a control signal including the moving speed information to the control target apparatus.

20 Claims, 17 Drawing Sheets

(58) Field of Classification Search
CPC .... G01C 221/12; G01C 221/16; G01C 22/00; B60W 2550/00; B60W 2550/10; B60W 2550/40; B60W 2550/402; B60W 2550/404; B60W 2550/406; B60W 2750/00; B60W 2750/40; B60L 2260/40; B60L 2260/44; B60L 2260/50; B60L 2240/00; B60L 2240/10; B60L 2240/24; B60L 2240/32; B60K 2310/00; B60K 2310/20; B60K 2310/26; A01B 69/00; G05D 2201/00; G05D 2201/02; G05D 2201/0203; G05D 2201/0206; G05D 2201/0207; G05D 2201/0214; G05D 2201/0216; G05D 2201/0215; G05D 3/00; G05D 3/12; G05D 3/14; G05D 1/00; G05D 1/02; G05D 1/0204; G05D 1/0214; G05D 1/0022; G05D 1/0223; G05D 1/0246; G05D 1/0274; G05D 1/0038; G05D 1/004
USPC .......................................................... 701/23
See application file for complete search history.

(56) References Cited

U.S. PATENT DOCUMENTS

| | | |
|---|---|---|
| 2014/0031983 A1 | 1/2014 | Low et al. |
| 2017/0293295 A1 | 10/2017 | Tani |

FOREIGN PATENT DOCUMENTS

| | | | |
|---|---|---|---|
| JP | 2005-242489 A | 9/2005 | |
| JP | 2006-285548 A | 10/2006 | |
| JP | 2008-065755 A | 3/2008 | |
| JP | 2010-061346 A | 3/2010 | |
| JP | 2010-248703 A | 11/2010 | |
| JP | 5323910 B2 | 10/2013 | |
| JP | 2016-071585 A | 5/2016 | |
| JP | 2016-215335 A | 12/2016 | |
| JP | 2017-049903 A | 3/2017 | |
| JP | 2017-061032 A | 3/2017 | |
| JP | 2017-097602 A | 6/2017 | |
| JP | 2017-107374 A | 6/2017 | |
| WO | WO-2008032673 A1 * | 3/2008 | ............. G05D 1/024 |

* cited by examiner

OVERSHOOT REGION

REMOTE CONTROL APPARATUS, SYSTEM, METHOD, AND PROGRAM

DESCRIPTION OF RELATED APPLICATION

This application is a National Stage Entry of PCT/JP2018/041339 filed on Nov. 7, 2018, which claims priority from Japanese Patent Application 2017-215744 filed on Nov. 8, 2017, the contents of all of which are incorporated herein by reference, in their entirety.

FIELD

The present invention relates to a remote control apparatus, system, method, and program that remotely control a control target apparatus at a remote place via a communication network.

BACKGROUND

With spread of internet or the like and increase in communication speed in recent years, efforts to build a remote control system are underway, the remote control system remotely controlling a control target apparatus such as an AGV (Automated Guided Vehicle), a drone, a construction machine, a security robot, a disaster rescue robot, a remote surgery support robot, and a mobile robot located in a remote place. In general, in such a remote control system for remotely controlling a control target apparatus, a wireless communication network such as LTE (Long Term Evolution), WiMAX (Worldwide Interoperability for Microwave Access), wireless LAN (Wireless Local Area Network) and/or the like is often used between the control target apparatus and the communication network.

As a remote control system using such a wireless communication network, for example, Patent Literature (PTL) 1 discloses an operation control system for remotely controlling a plurality of autonomous mobile bodies (corresponding to a control target apparatus) running in a factory or the like. In PTL 1, a centralized control apparatus (corresponding to a remote control apparatus) acquires position information from each autonomous mobile body via a wireless transmission path (corresponding to a wireless communication network), and instructs a destination to each autonomous mobile body depending on a transport instruction given from outside. Also, the autonomous mobile body to which the destination is instructed makes a running plan configured by a running route or the like and moves to the destination.

However, in the wireless communication network, data packet loss, communication delay or fluctuations thereof may occur due to change in received signal quality, communication line congestion or the like, and the stability of a remote control system controlling in real-time may deteriorate. For example, transmission of a control signal from the remote control apparatus is delayed by occurrence of data packets loss, communication delay, or fluctuation thereof in a communication network, which may cause a possibility that the control target apparatus moves more than expected (overshoots). If the control target apparatus overshoots, the control target apparatus may collide with a peripheral object(s) such as wall.

Therefore, studies are underway to develop technology that enables safely performing remote control even if a communication delay or fluctuation thereof occurs between the remote control apparatus and the control target apparatus.

As such a technology, for example, in PTL 2, in a system that a user of a collision prevention apparatus (corresponding to a remote control apparatus) remotely controls a mobile robot (corresponding to a control target apparatus) via a data communication network (corresponding to a communication network), safety is improved by issuing a warning sound before the mobile robot collides with an obstacle to make the user recognize the obstacle. In detail, the collision prevention apparatus maps a collision expecting region where the mobile robot may collide with the obstacle based on information including video information captured by a camera of the mobile robot, and when the mobile robot approaches the obstacle, warns the user by a warning sound prior to a predetermined collision expected time based on the information.

Also, in PTL 3, in a system in which an operator of an operation control apparatus (corresponding to a remote control apparatus) remotely controls a controlled object (corresponding to a control target apparatus) via a communication path (corresponding to a communication network), safety is improved by notifying the operator that the controlled body and an obstacle located around the controlled body are approaching each other before contacting each other. In detail, the controlled object performs: specifying a distance between the controlled object and the obstacle; acquiring an estimated value of the required transmission time (corresponding to a communication delay) in the communication path; and transmitting a notification to the operation control apparatus that the controlled object is approaching the obstacle at such a time to reach the operation control apparatus via the communication path from the controlled object, before the controlled object comes to contact with the obstacle, based on a distance and an estimated value of the transmission required time.

Furthermore, in PTL 4, safety is improved by autonomously controlling a moving speed of a mobile robot (corresponding to an apparatus to be controlled) before the mobile robot comes to contact with an obstacle. In detail, the mobile robot performs: detecting the obstacle; calculating a distance to the obstacle; calculating a moving speed at which the mobile robot can stop before contacting the obstacle based on the calculated distance; and moving at a calculated moving speed in a moving direction received from a monitoring center.

[PTL 1] JP2005-242489A
[PTL 2] JP5323910B2
[PTL 3] JP2010-248703A
[PTL 4] JP2006-285548A

SUMMARY

The following analyses are given by the present inventors.

In PTL 2, the collision prevention apparatus warns the user by a warning sound prior to a predetermined collision expected time. However, since the communication delay time in the data communication network is not considered, the mobile robot may collide with obstacles before the warning sound rings when a large communication delay time would occur. Also, PTL 2 does not disclose any motions after the warning, and operations of the collision prevention apparatus after the warning are relied on the user. Therefore, the mobile robot may collide with the obstacle depending on how the user operates.

In PTL 3, considering the communication delay time in the communication path, the operator is informed by vibration or the like in advance that the controlled object is approaching an obstacle. However, PTL 3 does not disclose any operations after the informing, and operations of the controlled body after the informing are relied on the operator. Therefore, the controlled object may collide with the obstacle depending on an operation content of the operator.

In PTL 4, the mobile robot autonomously controls the moving speed depending on a distance from the mobile robot to the obstacle. However, PTL 4 does not disclose any motions after controlling the moving speed. Since the mobile robot after stopping keeps its stopped state until safety is ensured, a remote control becomes impossible.

It is a main object of the present invention to provide a remote control apparatus, system, method, and program that can contribute to continue remote control without impairing safety even when a communication delay or fluctuation thereof occurs in a communication network.

According to a first aspect, there is provided a remote control apparatus that remotely controls a control target apparatus via a communication network, comprising: a communication part configured to transmit and receive predetermined data to and from the control target apparatus; and a control part configured to remotely control the control target apparatus through the communication part. The control part is configured to perform: calculating a path and a moving speed to reach a desired destination from a current position of the control target apparatus; measuring a communication delay time between the remote control apparatus and the control target apparatus; estimating an overshoot region based on the measured communication delay time, a stored size of the control target apparatus, and the calculated moving speed; predicting whether or not the control target apparatus will contact with a peripheral object(s), based on the calculated path, the estimated overshoot region and stored peripheral object information of the control target apparatus; calculating the moving speed information to be given to the control target apparatus so that a moving direction of the control target apparatus changes by a predetermined value or more when predicted that the control target apparatus will contact with a peripheral object(s); and transmitting a control signal including the calculated moving speed information to the control target apparatus.

According to a second aspect, a there is provided remote control system, comprising: a remote control apparatus according to the first aspect; the communication network; and the control target apparatus. The control target apparatus comprises: a communication part configured to transmit and receive predetermined data to and from the remote control apparatus; a motion part configured to perform a predetermined motion; a sensor part configured to measure a motion state according to a motion of the control target apparatus; and a control part configured to control the motion part. The control part of the control target apparatus is configured to perform: controlling motion of the motion part by using the control signal received from the remote control apparatus; acquiring the motion state measured by the sensor part; and transmitting a controlled signal including the motion state to the remote control apparatus.

According to a third aspect, there is provided a remote control method performed by using a remote control apparatus that remotely controls a control target apparatus via a communication network, comprises: calculating a path and a moving speed to reach a desired destination from a current position of the control target apparatus; measuring a communication delay time between the remote control apparatus and the control target apparatus; estimating an overshoot region based on the measured communication delay time, a stored size of the control target apparatus, and the calculated moving speed; predicting whether or not the control target apparatus will contact with a peripheral object(s), based on the calculated path, the estimated overshoot region, and stored peripheral object information of the control target apparatus; calculating the moving speed information to be given to the control target apparatus so that a moving direction of the control target apparatus changes by a predetermined value or more when predicted that the control target apparatus will contact with a peripheral object(s); and transmitting a control signal including the calculated moving speed information to the control target apparatus.

According to a fourth aspect, there is provided a remote control program that causes to execute remote control of a control target apparatus by a remote control apparatus, wherein the program is configured to execute: calculating a path and a moving speed to reach a desired destination from a current position of the control target apparatus; measuring a communication delay time between the remote control apparatus and the control target apparatus; estimating an overshoot region based on the measured communication delay time, a stored size of the control target apparatus, and the calculated moving speed; predicting whether or not the control target apparatus will contact with a peripheral object(s), based on the calculated path, the estimated overshoot region, and stored peripheral object information of the control target apparatus; calculating the moving speed information to be given to the control target apparatus so that a moving direction of the control target apparatus changes by a predetermined value or more when predicted that the control target apparatus will contact with a peripheral object(s); and transmitting a control signal including the calculated moving speed information to the control target apparatus. The program can be recorded on a compute readable storage medium. The storage medium can be non-transient storage medium such as a semiconductor memory, hard disk, magnetic recording medium, optical recording medium, or the like. Also, in the present disclosure, the program can be embodied as a computer program product.

According to the first to fourth aspects, it is possible to contribute to continue remote control without impairing safety even if communication delay or fluctuation thereof occurs in communication network.

PREFERRED MODES

Figure 1:
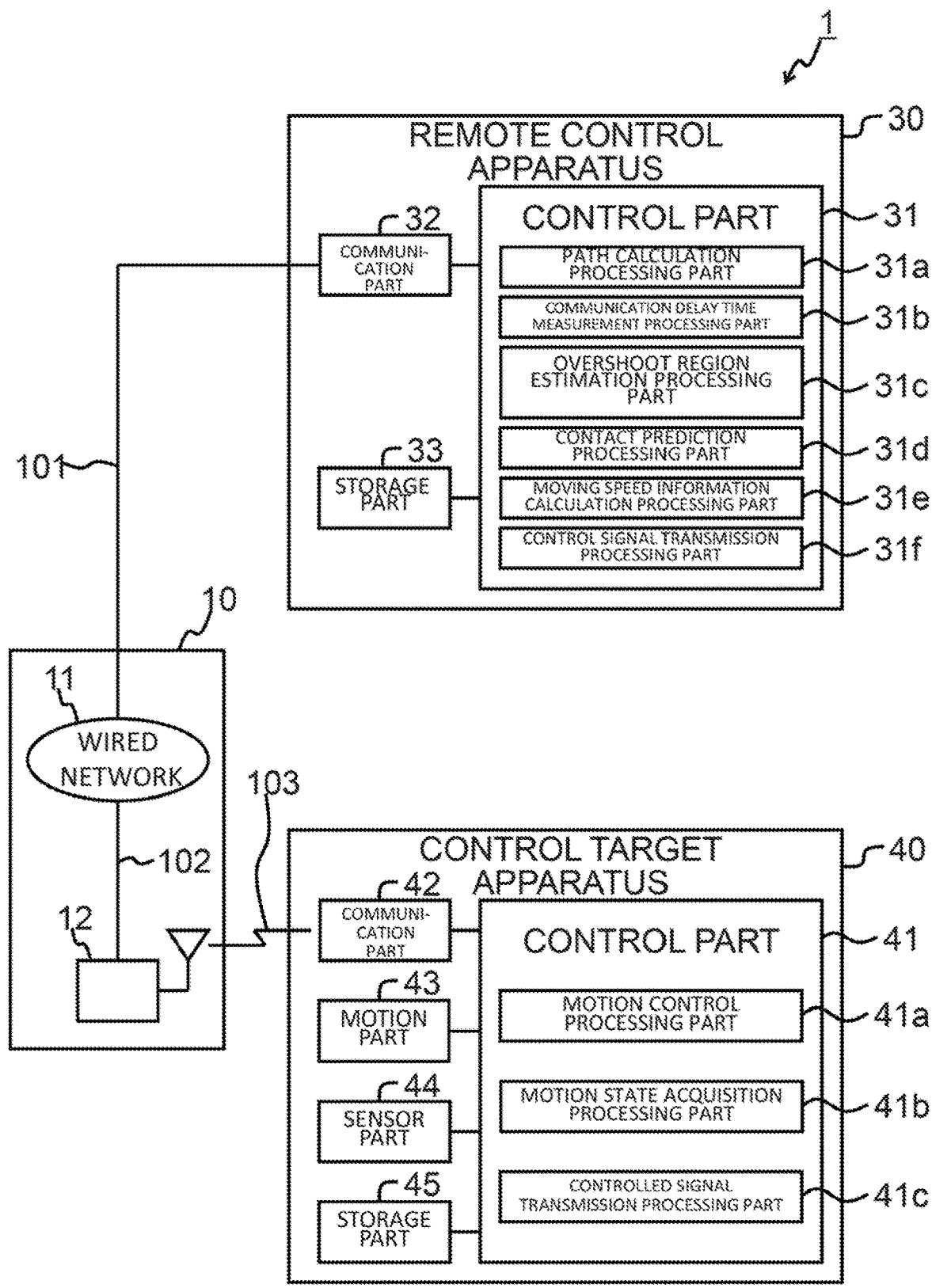
FIG. 1 is a block diagram schematically illustrating an example of a configuration of a remote control system according to a first example embodiment.

Hereinafter, example embodiments will be explained with reference to the drawings. It should be noted that, in the present application, when reference signs are given in the drawings, they are only for the purpose of facilitating understanding, and are not intended to limit to the example embodiments of the drawings. Also, the following example embodiments are merely examples, and do not limit the present invention. Further, connection lines between blocks in the drawings or the like referred to in the following explanation include both bidirectional and unidirectional. The one-way arrow schematically shows a flow of a main signal (data), and does not exclude bidirectionality. Furthermore, in a circuit diagram, a block diagram, an internal configuration diagram, a connection diagram, or the like shown in the disclosure of the present application, an input port and an output port exist at an input terminal and an output terminal of each connection line, respectively, although not explicitly shown. The same applies to an input/output interface.

FIRST EXAMPLE EMBODIMENT

A remote control system according to a first example embodiment will be explained with reference to the drawings. FIG. 1 is a block diagram schematically illustrating an example of a configuration of the remote control system according to the first example embodiment.

The remote control system 1 is a system that remotely controls motions of a control target apparatus 40 located at a remote place via a communication network 10 from a remote control apparatus 30. The motions of the control target apparatus 40 hereof are, for example, motions of the motion part 43 such as movement, turning (rotation) of the entire apparatus, and motions of an arm or a manipulator. The remote control system 1 comprises a communication network 10, a remote control apparatus 30, and a control target apparatus 40 as main component parts.

The communication network 10 is an information communication network that communicatably connects the remote control apparatus 30 and the control target apparatus 40. The communication network 10 comprises a wired network 11 and a wireless base station apparatus 12 as main component parts.

The wired network 11 is a communication network that performs wired communication. The wired network 11 is communicatably connected to a communication part 32 of the remote control apparatus 30 via a wired link 101. A base station control apparatus (not shown) in the wired network 11 is communicatably connected to the wireless base station apparatus 12 via a wired link 102.

The wireless base station apparatus 12 is an apparatus that provides a wireless communication service to a wireless terminal having a wireless communication function. The wireless base station apparatus 12 is communicatably connected to a communication part 42 of the control target apparatus 40 via a wireless link 103.

The communication network 10 is not limited to the configuration shown in FIG. 1 and may be configured to be connectable to the remote control apparatus 30 via a wireless link, or may be configured to be connectable to the control target apparatus 40 via a wired link.

The remote control apparatus 30 is an apparatus that remotely controls the control target apparatus 40 via the communication network 10. The remote control apparatus 30 is installed at a position (remote place) different from a position of the control target apparatus 40. The remote control apparatus 30 comprises a control part 31, a communication part 32, and a storage part 33 as main component parts.

The control part 31 is a functional part (block) that controls the communication part 32 and the storage part 33 and performs information processing of remotely controlling the control target apparatus 40. By reading a remote control program stored in the storage part 33; loading the remote control program into the main storage; and executing the readout remote control program due to the control part 31, the control part 31 realizes a path calculation processing part 31a, a communication delay time measurement processing part 31b, an overshoot region estimation processing part 31c, a contact prediction processing part 31d, a moving speed information calculation processing part 31e, and a control signal transmission processing part 31f.

The path calculation processing part 31a is an information processing part that calculates a path (moving route) and a moving speed for reaching from a current position of the control target apparatus 40 to a desired destination. The path calculation processing part 31a acquires a controlled signal from the control target apparatus 40 (controlled signal transmission processing part 41c) at a predetermined cycle or at an instructed timing. Here, as a current position of the control target apparatus 40, a position information and direction information of the control target apparatus 40 included in a latest controlled signal acquired from the control target apparatus 40 can be used. Also, the desired destination may be a destination given in advance to the remote control apparatus 30 from the exterior (not shown; for example, a controller). Further, as a method of calculating the path, any known method can be used. Furthermore, the path calculation processing part 31a calculates a moving speed for causing the control target apparatus 40 to follow the calculated path.

The communication delay time measurement processing part 31b is an information processing part that measures a communication delay time between the remote control apparatus 30 and the control target apparatus 40. The communication delay time measurement processing part 31b transmits and receives data (for example, ACK (ACKnowledgement) packet, PING (Packed InterNet Gopher) command, etc.) for measurement to and from the control target apparatus 40 via the communication part 32 and the communication network 10. Thereby, the communication delay time measurement processing part 31b calculates a round trip time (RTT) from a difference between a transmission time and a reception time of the data for the measurement, and measures the communication delay time (one-way delay time from the remote control apparatus 30 to the target apparatus 40) based on the calculated round trip time.

The overshoot region estimation processing part 31c is an information processing part that estimates an overshoot region based on: a size of the control target apparatus 40 stored in the storage part in advance; a moving speed calculated by the path calculation processing part 31a; and a communication delay time (round trip time may be used) measured by the communication delay time measurement processing part 31b.
Here, the overshoot region is, for example, a space formed by a distance that goes too far due to an influence of the communication delay time from a time when the remote control apparatus 30 instructs stoppage to the moving control target apparatus 40, to a time when the control target apparatus 40 actually stops; and a size of the control target apparatus 40.

The contact prediction processing part 31d is an information processing part that predicts whether or not the control target apparatus 40 will contact with a peripheral object(s) based on: the overshoot region estimated by the overshoot region estimation processing part 31c; and the peripheral object information of the control target apparatus 40 stored in the storage part 33 in advance. Here, the peripheral object information is, for example, a map information including a position of the peripheral object(s) such as a building such as a wall or a pillar, an equipment, or a mechanical apparatus, and is stored in the storage part 33 in advance. The contact prediction processing part 31d predicts that the control target apparatus 40 will contact with the peripheral object(s), when the overshoot region and the position of the peripheral object(s) according to the peripheral object information at least partially overlap; or when a closest distance between the overshoot region and the position of the peripheral object(s) according to the peripheral object information is less than a predetermined value.

The moving speed information calculation processing part 31e is an information processing part that calculates a moving speed information to instruct the control target apparatus 40. The moving speed information calculation processing part 31e, when the contact prediction processing part 31d predicts that there is no contact, calculates the moving speed information so that the control target apparatus 40 follows the path calculated by the path calculation processing part 31a. On the other hand, the moving speed information calculation processing part 31e, when the contact prediction processing part 31d predicts that a contact will occur, calculates the moving speed information so that a moving direction of the control target apparatus 40 changes by a predetermined value or more.

The control signal transmission processing part 31f is an information processing part that transmits a control signal including moving speed information to the control target apparatus 40 via the communication part 32 and the communication network 10. The control signal transmission processing part 31f transmits the control signal at a predetermined cycle or at any (arbitrary) timing.

The communication part 32 is a functional part that transmits and receives predetermined information, data, or signals between the remote control apparatus 30 and the control target apparatus 40. The communication part 32 transmits and receives information under control of the control part 31.

The storage part 33 is a functional part that stores a program(s) (including a remote control program), software, data, files, or the like. The storage part 33 performs reading, writing, or the like under control of the control part 31.

The program may be stored (installed) in the storage part 33 from a recording medium (not shown; a magnetic disk such as a flexible disk or a hard disk, a magnetic tape, an optical disk such as a CD (Compact Disk)-ROM (Read Only Memory), a DVD (Digital Versatile Disk) or the like, a memory card, a semiconductor memory, or the like) on which the program is recorded, via a machine reading apparatus (not shown) of the recording medium and an interface (not shown). Also, the program may be transmitted from a storage apparatus (not shown) of another computer (not shown), via a wired or wireless network medium (not shown) and a communication interface (not shown), to be stored (installed) to the storage part 33.

The control target apparatus 40 is an apparatus that is remotely controlled from the remote control apparatus 30 via the communication network 10. The control target apparatus 40 can be installed at a work site such as a factory or a warehouse, for example. As the control target apparatus 40, for example, apparatus such as an AGV, a drone, a construction machine, a security robot, a disaster rescue robot, a remote surgery support robot, and a mobile robot can be used. The control target apparatus 40 comprises, as main component parts, a control part 41, a communication part 42, a motion (actuation) part 43, a sensor part 44, and a storage part 45.

The control part 41 is a functional part that controls the communication part 42, the motion part 43, the sensor part 44, and the storage part 45, and performs information processing for causing to move the motion part 43 depending on an instruction from the remote control apparatus 30. The control part 41, by reading out a remote control program stored in the storage part 45; loading the remote control program into a main memory; and executing the read remote control program, realizes a motion control processing part 41*a*, a motion state acquisition processing part 41*b*, and a controlled signal transmission processing part 41*c*.

The motion control processing part 41*a* is an information processing part that controls motions of the motion part 43 based on a control signal from the remote control apparatus 30.

The motion state acquisition processing part 41*b* is an information processing part that acquires a motion state (for example, a current position, a direction(s), an angle(s), a speed or the like of the control target apparatus 40) according to motions of the motion part 43 detected by the sensor part 44. The motion state acquisition processing part 41*b* acquires the motion state from the sensor part 44 depending on a predetermined cycle or a request from the remote control apparatus 30.

The controlled signal transmission processing part 41*c* is an information processing part that transmits a controlled signal including a motion state to the remote control apparatus 30 via the communication part 42 and the communication network 10. The controlled signal transmission processing part 41*c* transmits the controlled signal at a predetermined cycle or at a timing instructed to the remote control apparatus 30 (path calculation processing part 31*a*).

The communication part 42 is a functional part that transmits and receives predetermined data to and from the remote control apparatus 30. The communication part 42 transmits and receives information under control of the control part 41.

The motion part 43 is a functional part that performs a predetermined motion, and is, for example, a motor control apparatus, a hydraulic control apparatus, an engine control apparatus, or the like. Motions of the motion part 43 includes, for example, displacement, rotation, turning, sliding, expansion, contraction, or the like. The motion part 43 moves under control of the control part 41.

The sensor part 44 is a functional part that detects a motion state according to motions of the motion part 43. As the sensor part 44, for example, sensor such as a position sensor, a direction sensor, an angle sensor, a rotation sensor, an acceleration sensor, a distance sensor, a pressure sensor, and/or a magnetic sensor can be used. The sensor part 44 detects a motion state through control of the control part 41.

The storage part 45 is a functional part that stores data such as software, program, database, file, and information. The storage part 45 performs reading, writing, or the like through control of the control part 41.

Figure 2:
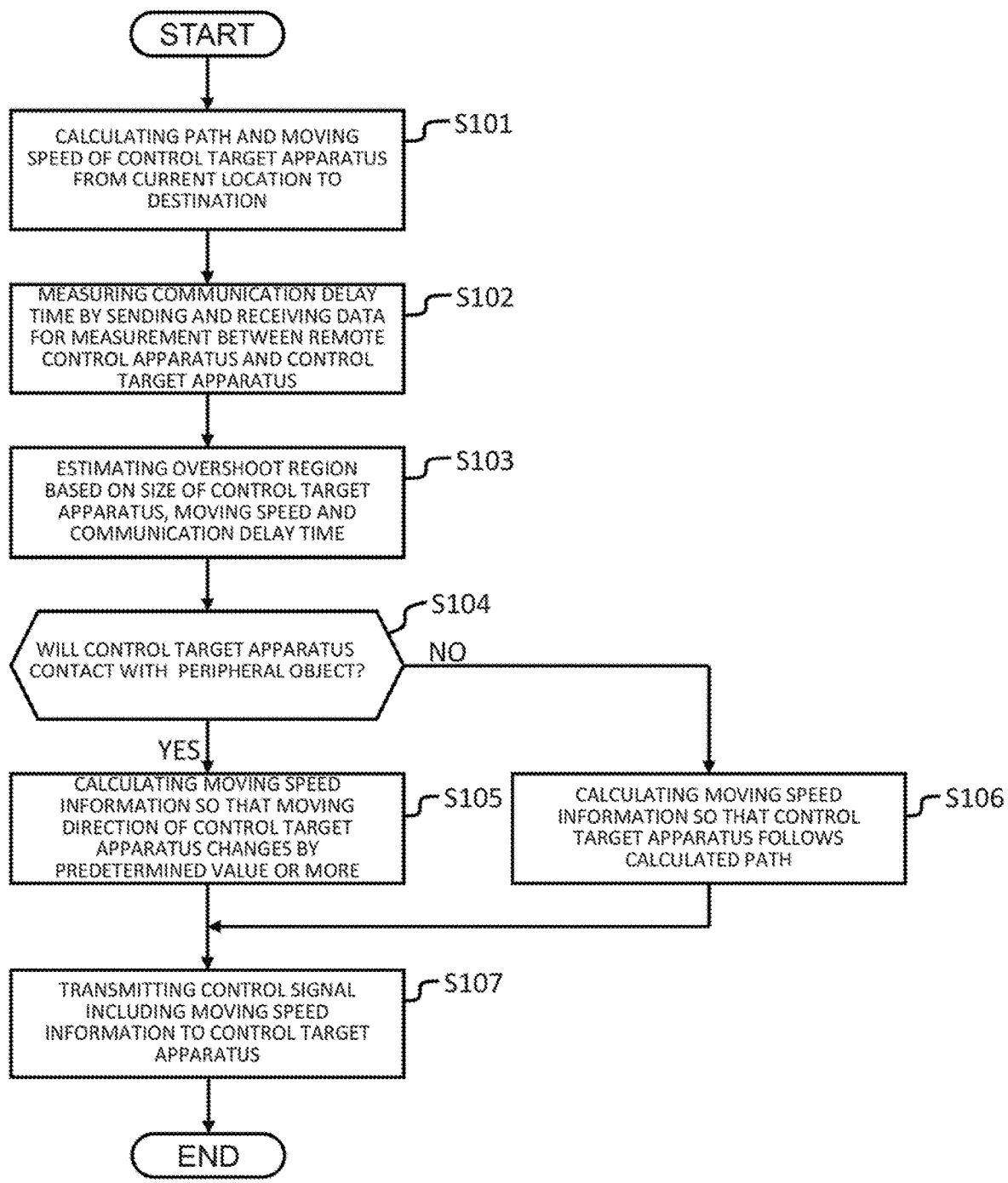
FIG. 2 is a flowchart schematically illustrating an example of operations of a control part of the remote control apparatus in the remote control system according to the first example embodiment.

Next, operations of the control part of the remote control apparatus in the remote control system according to the first example embodiment will be explained with reference to drawings. FIG. 2 is a flowchart schematically illustrating an example of operations of the control part of the remote control apparatus in the remote control system according to the first example embodiment. As to the configuration of the remote control system 1, please see FIG. 1.

First, the control part 31 (path calculation processing part 31*a*) of the remote control apparatus 30 calculates a path (moving route) and a moving speed for the control target apparatus 40 to reach a desired destination from a current position (step S101).

Here, the path calculation processing part 31*a* acquires a controlled signal from the control target apparatus 40 at a predetermined cycle or at any timing. Also, in the calculation of the path of the path calculation processing part 31*a*, for example, a trajectory connecting the current position with a desired destination (straight line, curve (parabola, spline curve, clothoid curve, etc.), arc, etc.) is calculated based on position information and direction information as the current position of the controlled device 40 included in the latest controlled signal acquired from the controlled device 40; and a desired destination given in advance to the remote control device 30 from the outside. Further, the path calculation processing part 31*a* calculates a moving speed for the control target apparatus 40 in order to follow the calculated path.

Next, the control part 31 (communication delay time measurement processing part 31*b*) of the remote control apparatus 30 transmits and receives data for measurement between the remote control apparatus 30 and the control target apparatus 40, thereby measuring a communication delay time (round trip delay time may be used) (step S102).

Here, when measuring the communication delay time, the communication delay time measurement processing part 31*b* transmits the data for the measurement (for example, ACK (ACKnowledgement) packet) including at least one of an identification number or a transmission time at a predetermined cycle or at any timing with respect to the control target apparatus 40. The transmitted data for the measurement is received by the control target apparatus 40, and is immediately returned from the control target apparatus 40 to the remote control apparatus 30. Upon receiving the data for the measurement returned from the control target apparatus 40, the communication delay time measurement processing part 31*b* calculates a round trip delay time by comparing a reception timing and a transmission timing of the data for the measurement, and measures the communication delay time based on the calculated round trip delay time. When a transmission time is not included in the data for the measurement, the communication delay time measurement processing part 31*b* stores the associated data for the measurement in the storage part 33 by associating the identification number of the data for the measurement with the transmission time.

Next, the control part 31 (overshoot region estimation processing part 31*c*) of the remote control apparatus 30 estimates an overshoot region based on the communication delay time (the round-trip delay time may be used) measured by the communication delay time measurement processing part 31*b*; a size of the control target apparatus 40 stored in the storage part 33 in advance; and a moving speed calculated by the path calculation processing part 31*a* (step S103).

Figure 3A:
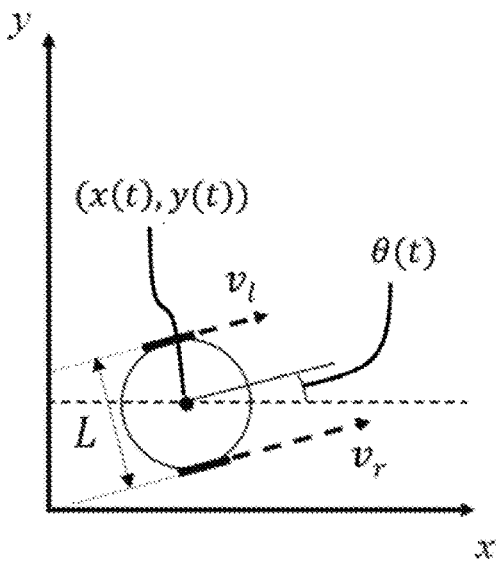
FIG. 3A is a schematic diagram of a current position for illustrating an estimation process of an overshoot region of the control part of the remote control apparatus in the remote control system according to the first example embodiment.
Figure 3B:
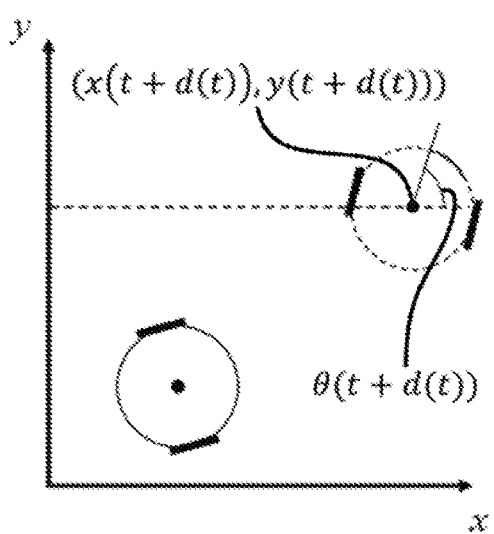
FIG. 3B is a schematic diagram when assuming an overshoot for illustrating an estimation process of an overshoot region of the control part of the remote control apparatus in the remote control system according to the first example embodiment.
Figure 3C:
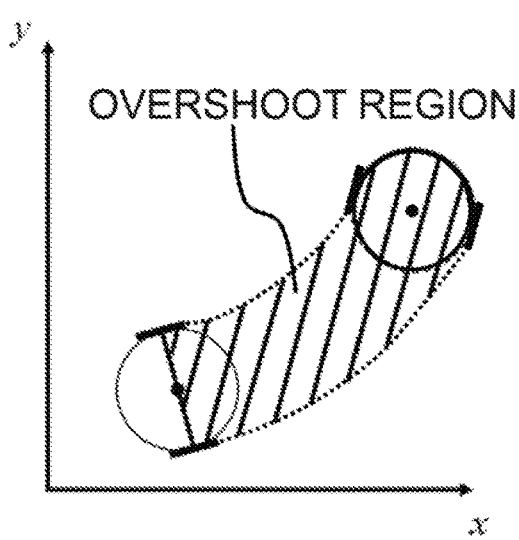
FIG. 3C is a schematic diagram of the overshoot region for illustrating an estimation process of an overshoot region of the control part of the remote control apparatus in the remote control system according to the first example embodiment.

Here, a method of estimating (calculating) an overshoot region will be explained by using an example case where the control target apparatus 40 is a mobile robot of counter two-wheel-type. FIGS. 3A to 3C are schematic diagrams for explaining an overshoot region estimation process of the control part of the remote control apparatus in the remote control system according to the first example embodiment. FIG. 3A shows position information and direction information of the control target apparatus 40 included in the controlled signal received by the remote control apparatus 30 at a time (t); a moving speed of the motion part 43 (left and/or right wheels) for the control target apparatus 40 in order to follow the calculated path; and a size of the control target apparatus 40. FIG. 3B shows an estimated value position and an estimated direction of the control target apparatus 40 estimated by using Formulas 1 to 3 based on the assumption that the control target apparatus 40 moves excessively (overshoots) due to an influence of the communication delay time. FIG. 3C shows an estimated overshoot region of the control target apparatus 40. That is, by using the measured communication delay time, a region where the control target apparatus 40 moves during the communication delay time is estimated as an overshoot region.

Here, symbols of "time", "position information (X-axis)", "position information (Y-axis)", "direction information", "moving speed (right wheel)", "moving speed (left wheel)", "size of control target apparatus", "communication delay time", "estimated position (X-axis)", "estimated position (Y-axis)", and "estimated direction" appearing in Formulas 1 to 3 are defined, respectively, as follows.

Time=t
Position information (X-axis)=x(t)
Position information (Y-axis)=y(t)
Direction information=θ(t)
Moving speed (right wheel)=$v_r$
Moving speed (left wheel)=$v_l$
Size of control target apparatus=L
Communication delay time=d(t)
Estimated position (X-axis)=x(t+d(t))
Estimated position (Y-axis)=y(t+d(t))
Estimated direction=θ(t+d(t))

$$x(t+d(t)) = x(t) + d(t)\frac{v_r + v_l}{2}\cos\left(\theta(t) + d(t)\frac{v_r - v_l}{2L}\right) \quad \text{[Formula 1]}$$

$$y(t+d(t)) = y(t) + d(t)\frac{v_r + v_l}{2}\sin\left(\theta(t) + d(t)\frac{v_r - v_l}{2L}\right) \quad \text{[Formula 2]}$$

$$\theta(t+d(t)) = \theta(t) + d(t)\frac{v_r - v_l}{L} \quad \text{[Formula 3]}$$

Next, the control part 31 (the contact prediction processing part 31*d*) of the remote control apparatus 30 predicts whether or not the control target apparatus 40 will contact with a peripheral object(s) based on the overshoot region estimated in step S103; and the peripheral object information of the control target apparatus 40 stored in the storage part 33 in advance (Step S104).

Here, in the prediction of whether or not the control target apparatus 40 will contact with the peripheral object(s), for example, when the overshoot region and the position of the peripheral object(s) according to the peripheral object information at least partially overlap, or when a closest distance between the overshoot region and the position of the peripheral object(s) according to the peripheral object information is less than a predetermined value, it is predicted that the control target apparatus 40 will contact with the peripheral object(s).

When it is predicted that the contact will occur (step S104: YES), the control part 31 (moving speed information calculation processing part 31*e*) of the remote control apparatus 30 calculates a moving speed information in order to give to the control target apparatus 40 so that the moving direction of the control target apparatus 40 changes by a predetermined value or more (step S105).

As a method of calculating the moving speed information, for example, when the control target apparatus 40 is a mobile robot of counter two-wheel-type, when making the control target apparatus 40 a turning motion on a spot in order to avoid contact between the control target apparatus 40 and a peripheral object(s), the moving speed information calculation processing part 31*e* can calculate the moving speed information in order to give to the control target apparatus 40 so that at the same rotational speed, one is in a forward direction and the other is in a reverse direction to the motion part 43 (the left and/or right wheels) of the control target apparatus 40. Also, when making the control target apparatus 40 a circular motion with any curvature in order to avoid contact between the control target apparatus 40 and the peripheral object(s), the moving speed information calculation processing part 31*e* can calculate the moving speed information in order to give to the control target apparatus 40 so that a moving speed given to the motion part 43 (for example, the left wheel) closer to the peripheral object(s) of the control target apparatus 40 is increased, and a moving speed given to the motion part 43 (for example, the right wheel) remote from the peripheral object(s) of the control target apparatus 40 is reduced.

On the other hand, when it is predicted that the contact will not occur (step S104: NO), the control part 31 (moving speed information calculation processing part 31*e*) of the remote control apparatus 30 calculates a moving speed information in order to give to the control target apparatus 40 so that the control target apparatus 40 follows the path calculated by the path calculation processing part 31*a* (step S106). When the moving speed calculated by the path calculation processing part 31*a* is used as the moving speed information, step S106 may be omitted and the process may proceed to step S107.

After step S105 or step S106, the control part 31 (control signal transmission processing part 31*f*) of the remote control apparatus 30 transmits the control signal including the moving speed information calculated in step S105 or step S106 to the control target apparatus 40 via the communication part 32 and the communication network 10 (step S107). Then returns to the start.

Figure 4:
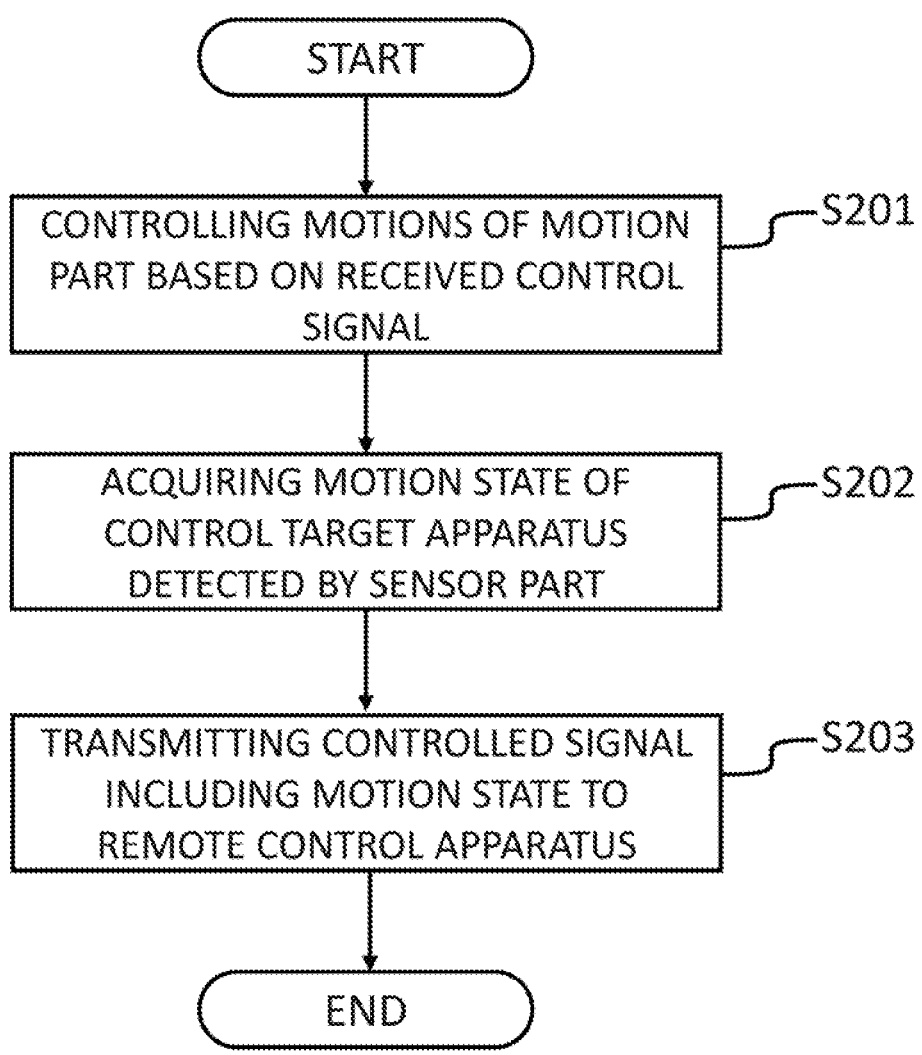
FIG. 4 is a flowchart schematically illustrating an example of operations of the control part of the control target apparatus in the remote control system according to the first example embodiment.

Next, operations of the control part of the control target apparatus in the remote control system according to the first example embodiment will be explained with reference to drawings. FIG. 4 is a flowchart schematically illustrating an example of operations of the control part of the control target apparatus in the remote control system according to the first example embodiment. As to the configuration of the remote control system 1, please see FIG. 1.

First, the control part 41 (the motion control processing part 41*a*) of the control target apparatus 40 controls motions of the motion part 43 based on a control signal received from the remote control apparatus 30 via the communication network 10 and the communication part 42. (Step S201).

Next, the control part 41 (the motion state acquisition processing part 41*b*) of the control target apparatus 40 acquires a motion state of the control target apparatus 40 measured by the sensor part 44 (Step S202).

The acquisition of the motion state is not limited to after step S201 and may be performed before step S201 or simultaneously with step S201 and may be performed at a predetermined cycle or in response to a request from the remote control apparatus 30. Also, the motion state includes, for example, angle, rotation speed, number of rotations, torque, acceleration, distance to a peripheral object(s), pressure, direction or the like.

Next, the control part 41 (the controlled signal transmission processing part 41*c*) of the control target apparatus 40 transmits a controlled signal including the motion state acquired by the motion state acquisition processing part 41*b* to the remote control apparatus 30 (step S203). Then returns to the start.

According to the first example embodiment, when the remote control apparatus 30 remotely controls the control target apparatus 40 via the communication network 10, an overshoot region where the control target apparatus 40 moves in consideration of the communication delay time is estimated, when it is predicted that the control target apparatus 40 will contact with a peripheral object(s), the moving direction of the control target apparatus 40 is changed, thereby impairing safety even if a communication delay or its fluctuation occurs in the communication network 10, the remote control can be continued without impairing safety and contributes to the improvement of safety in the remote control system 1.

SECOND EXAMPLE EMBODIMENT

Figure 5:
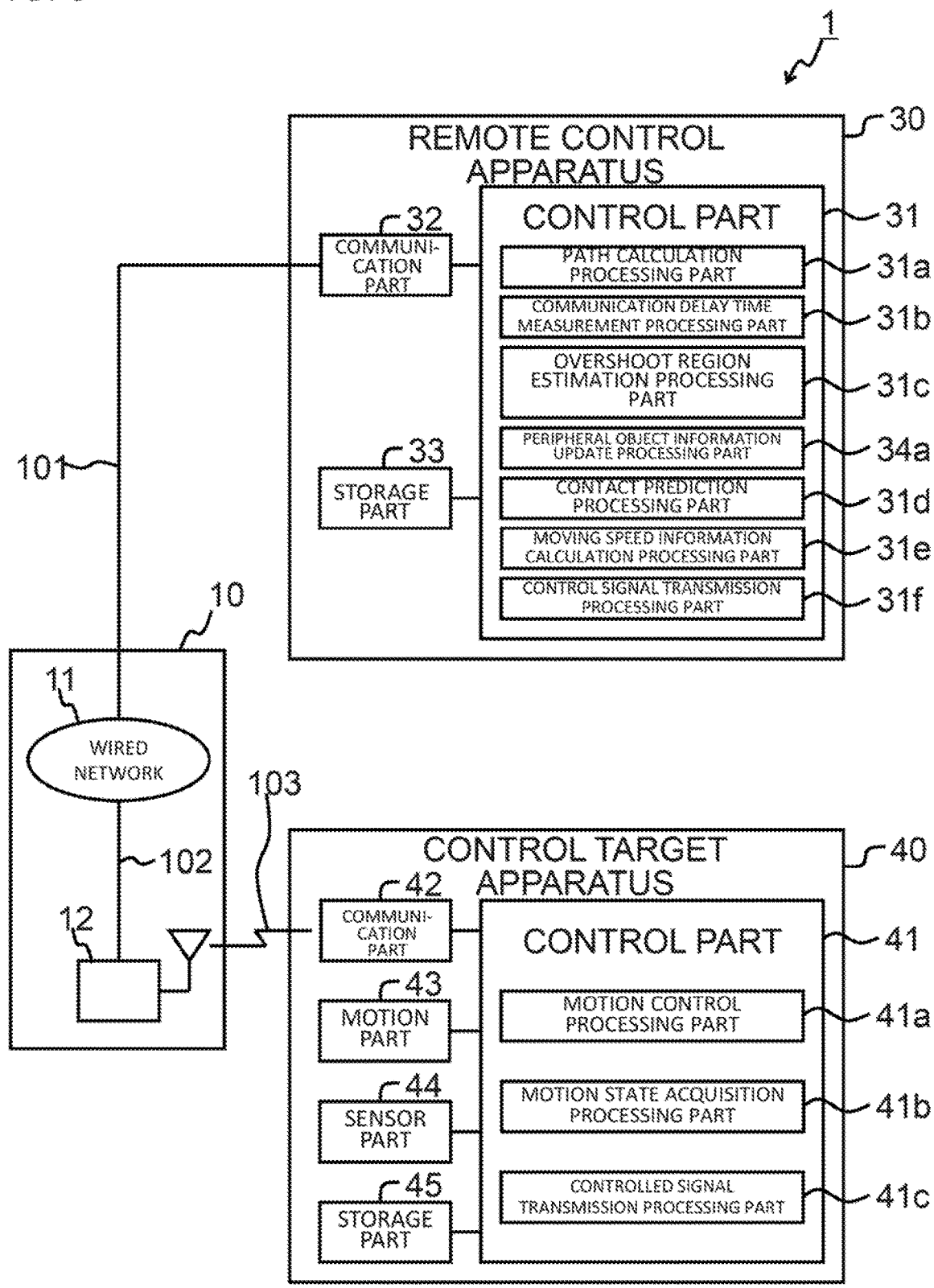
FIG. 5 is a block diagram schematically illustrating an example of a configuration of a remote control system according to a second example embodiment.
Figure 6:
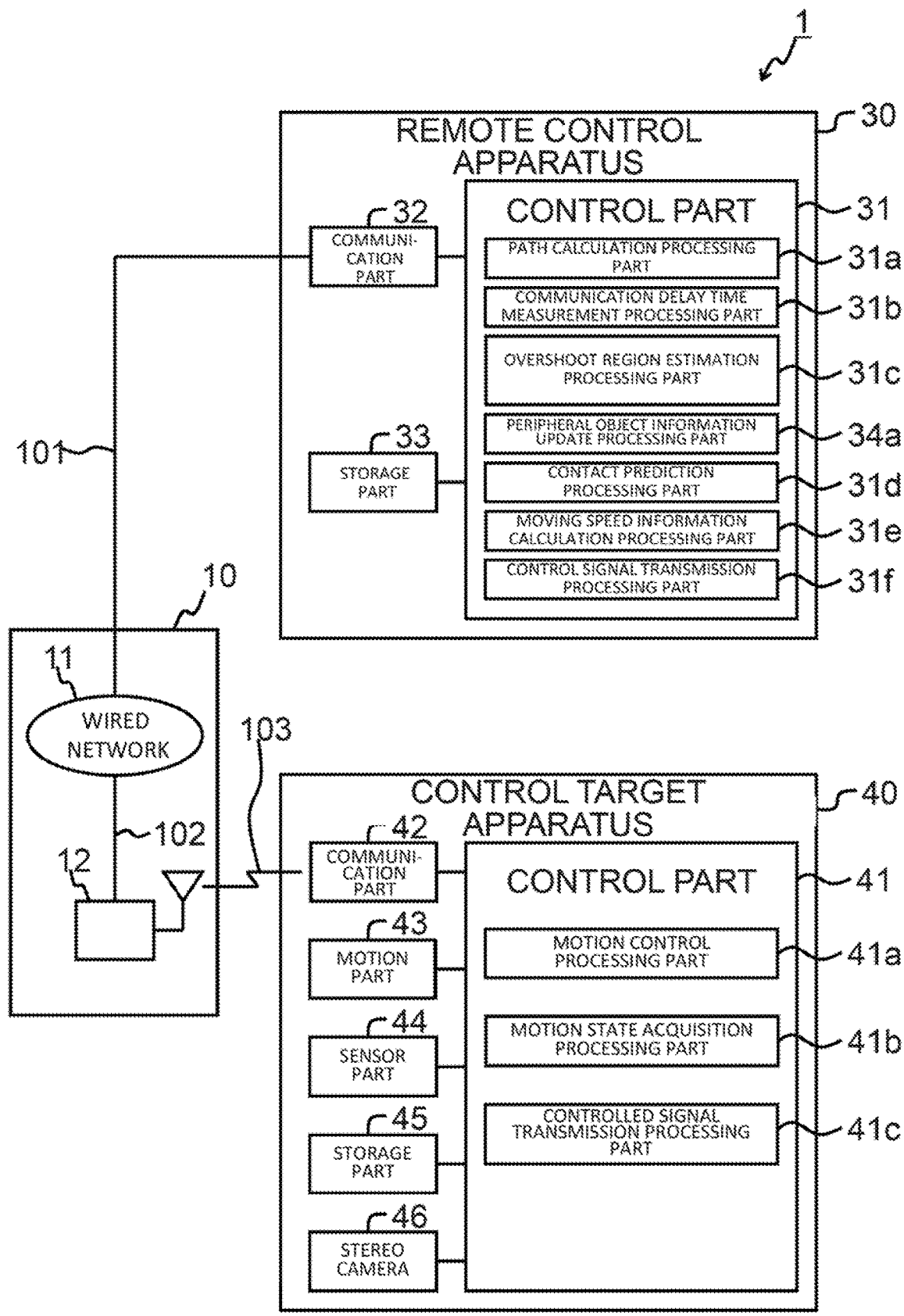
FIG. 6 is a block diagram schematically illustrating a modified example of the configuration of the remote control system according to the second example embodiment.
Figure 7:
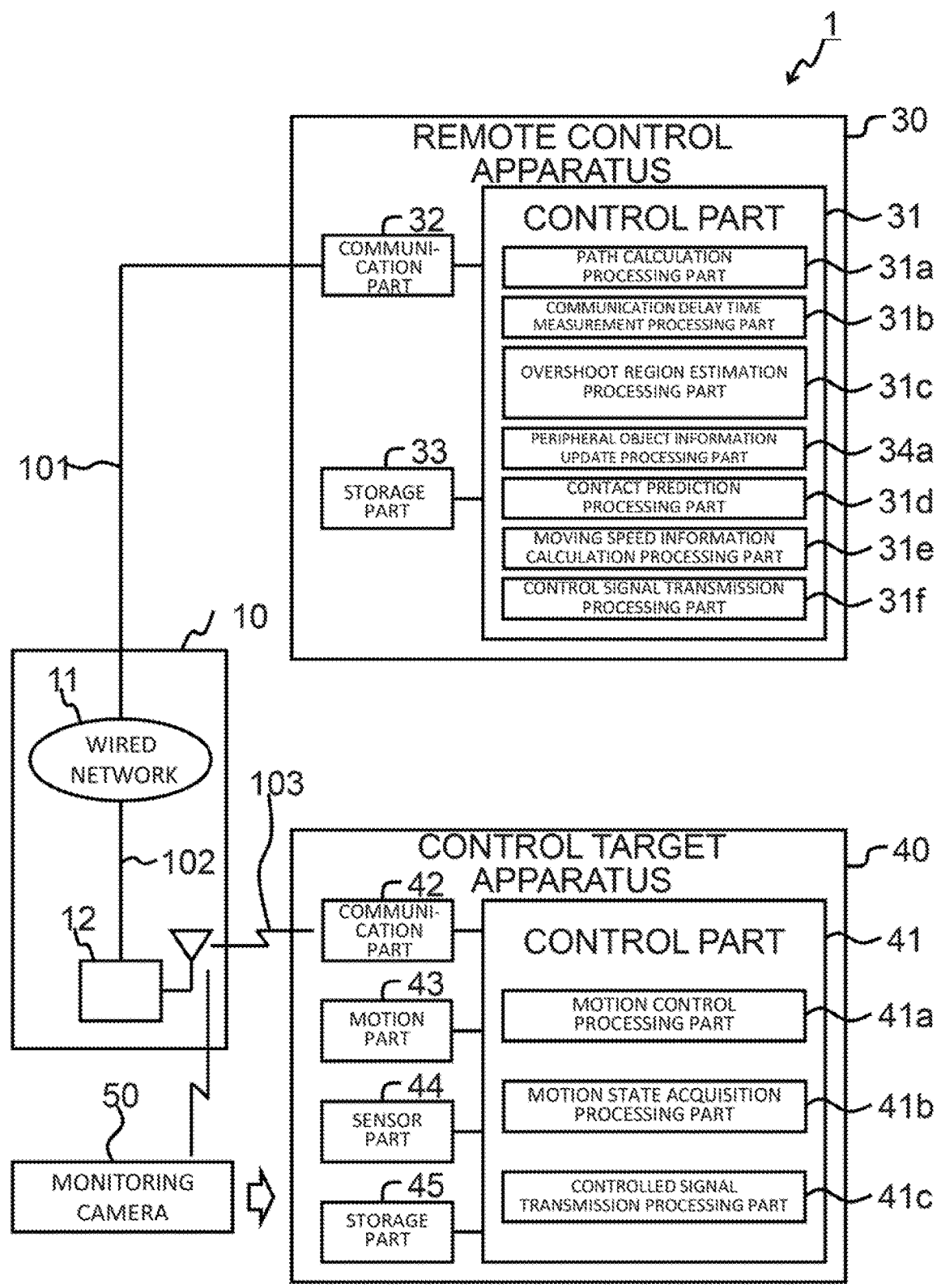
FIG. 7 is a block diagram schematically illustrating another modified example of the configuration of the remote control system according to the second example embodiment.

A remote control system according to a second example embodiment will be explained with reference to drawings. FIGS. 5 to 7 are block diagrams schematically illustrating configuration of the remote control system according to the second example embodiment.

The configuration of the remote control system 1 according to the second example embodiment is different from the configuration of the control part 31 of the remote control apparatus 30 in which a peripheral object information update processing part 34a is newly added.

The peripheral object information update processing part 34a acquires a controlled signal including a distance (corresponding to a motion state and a peripheral object information) between the control target apparatus 40 detected (measured) by the sensor part 44 (herein, a distance sensor) of the control target apparatus 40 and the peripheral object(s) from the control target apparatus 40 via the communication network 10 and the communication part 32 at a predetermined cycle or at any timing, and updates the peripheral object information stored in the storage part 33 by using the distance included in the acquired controlled signal as the peripheral object information (see FIG. 5).

Also, when the control target apparatus 40 comprises a stereo camera 46, the peripheral object information update processing part 34a may acquire a controlled signal including an image (corresponding to a motion state) of a peripheral object(s) from the control target apparatus 40 via the communication network 10 and the communication part 32 at a predetermined cycle or at any timing; calculate a distance from the control target apparatus 40 to the peripheral object(s) based on an image (corresponding to a motion state) included in the acquired controlled signal by using generally known image processing technology, from a parallax of the image; and update the peripheral object information stored in the storage part 33d by using the calculated distance as the peripheral object information (see FIG. 6).

Further, when a monitoring camera 50 that monitors an area in which the control target apparatus 40 moves is installed, the peripheral object information update processing part 34a may acquire a controlled signal including an image (corresponding to the motion state) of the area captured by the monitoring camera 50 from the monitoring camera 50 via the communication network 10 and the communication part 32 at a predetermined cycle or at any timing; detect positions of the control target apparatus 40 and the peripheral objects from the image based on the image (corresponding to the motion state) included in the acquired controlled signal by using commonly known image processing technology; calculate a distance from the control target apparatus 40 to the peripheral object(s) based on a detected position; and update the peripheral object information stored in the storage part 33 by using the calculated distance as the peripheral object information (see FIG. 7).

Other configuration of the second example embodiment are the same as those of the first example embodiment.

Figure 8:
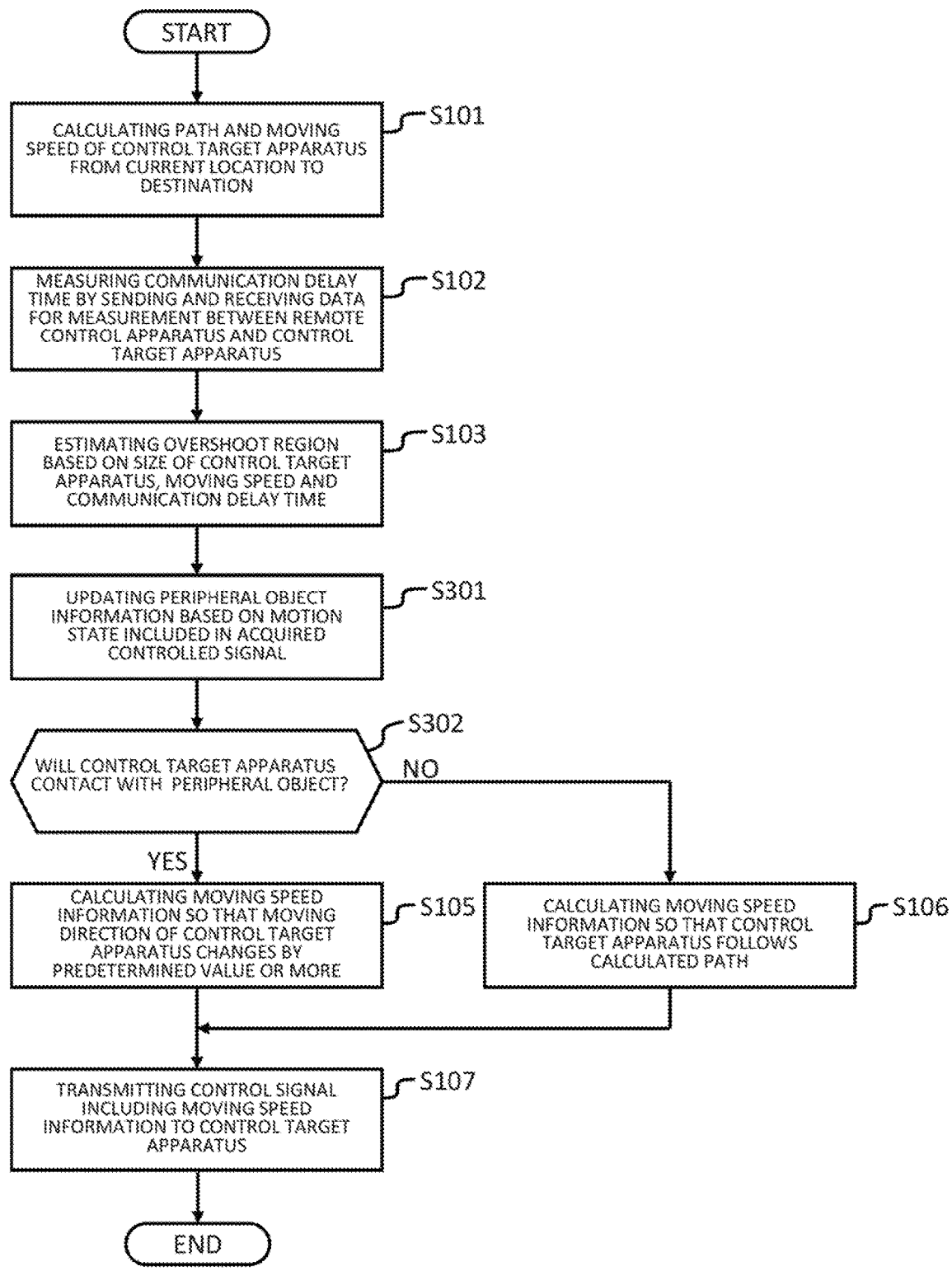
FIG. 8 is a flowchart schematically illustrating an example of operations of the control part of the remote control apparatus in the remote control system according to the second example embodiment.

Next, operations of the control part of the remote control apparatus in the remote control system according to the second example embodiment will be explained with reference to drawings. FIG. 8 is a flowchart schematically illustrating an example of operations of the control part of the remote control apparatus in the remote control system according to the second example embodiment. As to the configuration of the remote control system 1, please see FIGS. 5 to 7.

First, the control part 31 of the remote control apparatus 30 performs the same operation steps as steps S101 to S103 in FIG. 2 of the first example embodiment (steps S101 to S103 in FIG. 8).

Next, the control part 31 (the peripheral object information update processing part 34a) of the remote control apparatus 30 updates the peripheral object information stored in the storage part 33 based on the motion state included in the acquired latest controlled signal (step S301).

Here, the peripheral object information update processing part 34a receives the controlled signal including the motion state from the control target apparatus (40 in FIGS. 5 to 7) or the monitoring camera (50 in FIG. 7) at a predetermined cycle or at any timing. Also, when the motion state included in the controlled signal is the distance between the control target apparatus 40 and the peripheral object(s), the peripheral object information update processing part 34a updates the peripheral object information stored in the storage part 33 by using the distance as the peripheral object information. Further, when the motion state included in the controlled signal is an image of a peripheral object(s) image-shot by the stereo camera (46 in FIG. 6), the peripheral object information update processing part 34a calculates a distance from the control target apparatus 40 to the peripheral object(s) based on parallax of the image by using a generally known image processing technique, and updates the peripheral object information stored in the storage part 33 by using the calculated distance as the peripheral object information. Furthermore, when the motion state included in the controlled signal is an image including the control target apparatus 40 and the peripheral object(s) image-shot by the monitoring camera (50 in FIG. 7), the peripheral object information update processing part 34a detects a position of the control target apparatus 40 from (relative to) the peripheral object(s) based on the image by using a generally known image processing technique; calculates the distance from the detected control target apparatus 40 to the peripheral object(s) based on the detected position; and updates the peripheral object information stored in the storage part 33 by using the calculated distance as the peripheral object information.

Next, the control part 31 (the contact prediction processing part 31d) of the remote control apparatus 30 predicts whether or not the control target apparatus 40 will contact with the peripheral object(s) based on the overshoot region estimated in step S103 and the peripheral object information updated in step S301 (step S302).

When it is predicted that a contact will occur (step S302: YES), the control part 31 of the remote control apparatus 30 performs the same operation steps as steps S105 and S107 in FIG. 2 of the first example embodiment (steps S105 and S107 in FIG. 8), then returns to start.

On the other hand, when it is predicted that no contact will occur (step S302: NO), the control part 31 of the remote control apparatus 30 performs the same operation steps as steps S106 and S107 in FIG. 2 of the first example embodiment (steps S106 and S107 in FIG. 8), then returns to the start.

According to the second example embodiment, similarly to the first example embodiment, the remote control can be continued without impairing safety even if a communication delay or its fluctuation occurs in the communication network 10, and it can contribute to the improvement of the safety.

Also, according to the second example embodiment, since the control target apparatus 40 or the remote control apparatus 30 detects (measures) or calculates the distance between the control target apparatus 40 and the peripheral object(s); and remotely controls the control target apparatus 40 while updating the peripheral object information stored in the storage part 33 by using the calculated distance as the peripheral object(s) of the control target apparatus 40, a collision with the peripheral object(s) can be avoided even if a new peripheral object(s) appears (for example, a new luggage is placed on a path (moving route)), and it can contribute to the improvement of the safety in the remote control system 1.

Further, assuming that a plurality of control target apparatuses 40 move simultaneously, when paths of the plurality of control target apparatuses 40 overlap, the existence of each other may be peripheral objects, however, according to the second example embodiment, since a collision between the control target apparatuses 40 can be avoided even in such a case, it can contribute to the improvement of the safety in the remote control system 1.

THIRD EXAMPLE EMBODIMENT

Figure 9:
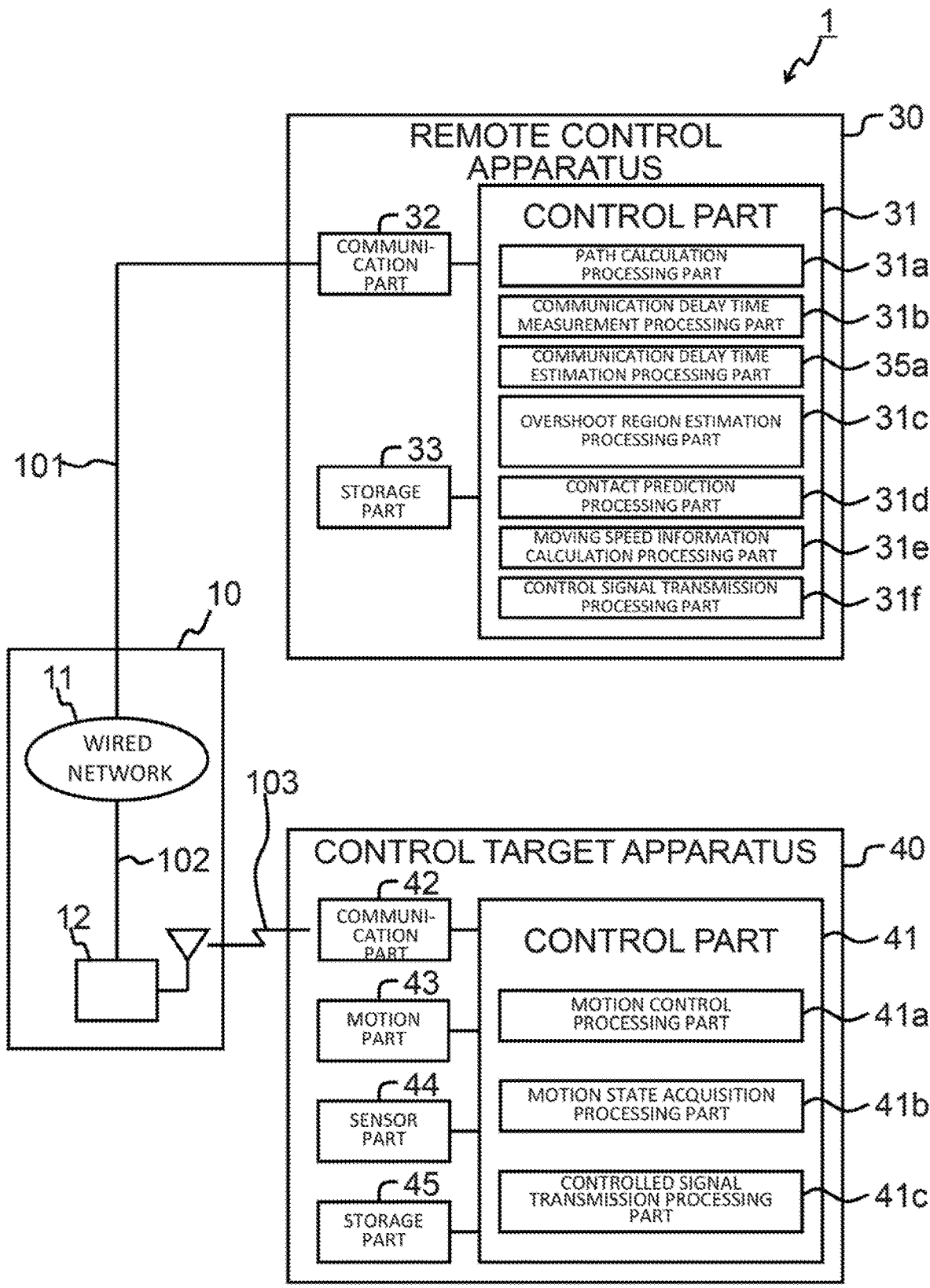
FIG. 9 is a block diagram illustrating an example of a configuration of a remote control system according to a third example embodiment.

A remote control apparatus in a remote control system according to a third example embodiment will be explained with reference to drawings. FIG. 9 is a block diagram schematically illustrating an example of a configuration of the remote control system according to the third example embodiment.

The configuration of the remote control system 1 according to the third example embodiment is different from the first example embodiment in that a communication delay time estimation processing part 35a is newly comprised in the configuration of the control part 31 of the remote control apparatus 30.

The communication delay time estimation processing part 35a estimates a future communication delay time based on the communication delay time (a round-trip delay time may be used) measured by the communication delay time measurement processing part 31b. A method of estimating the future communication delay time will be explained later.

Other configurations of the third example embodiment are the same as those of the first example embodiment. The third example embodiment may be appropriately combined with the second example embodiment.

Figure 10:
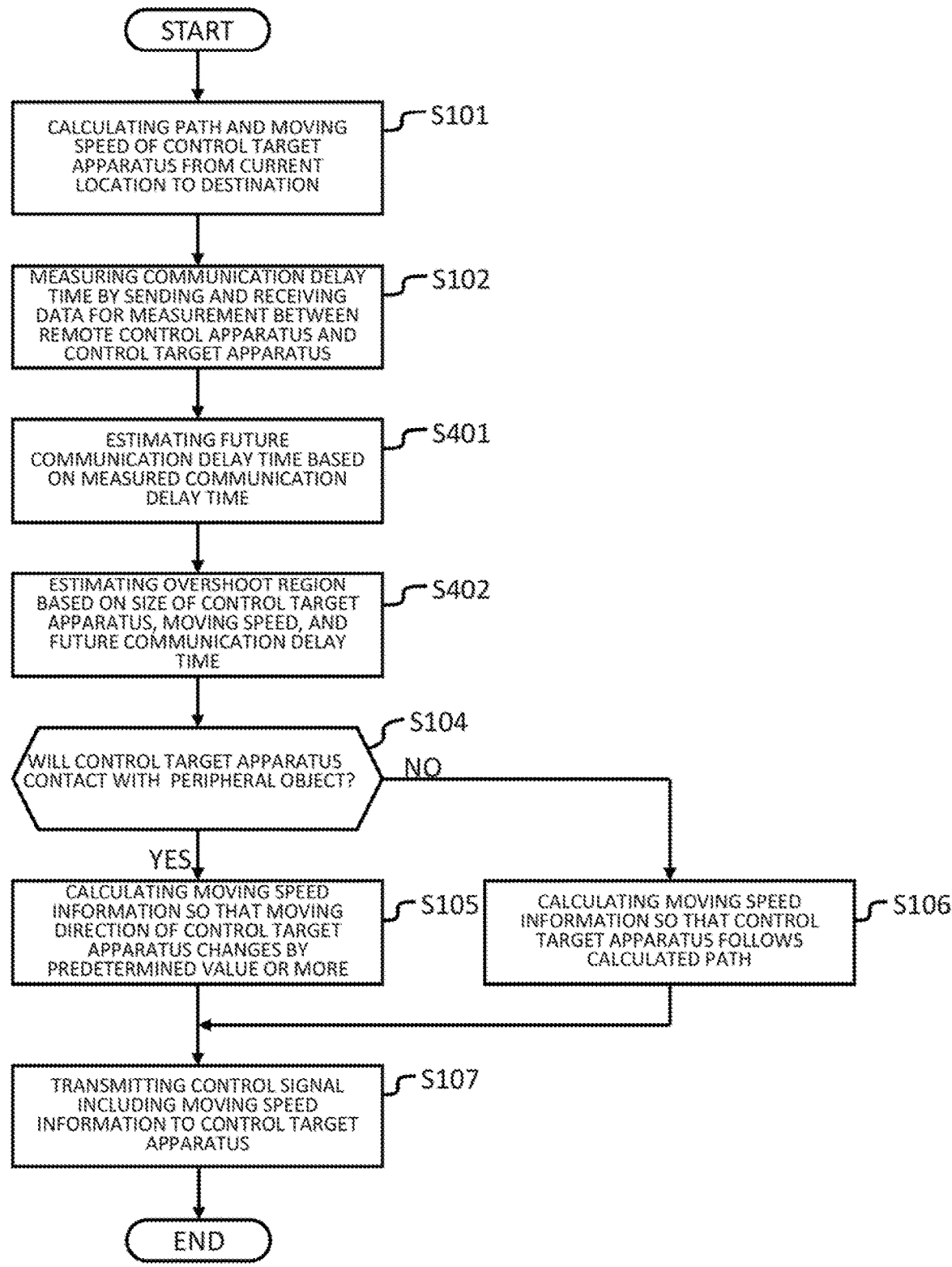
FIG. 10 is a flowchart schematically illustrating an example of operations of the control part of the remote control apparatus in the remote control system according to the third example embodiment.

Next, operations of the control part of the remote control apparatus in the remote control system according to the third example embodiment will be explained with reference to drawings. FIG. 10 is a flowchart schematically illustrating an example of operations of the control part of the remote control apparatus in the remote control system according to the third example embodiment. As to the configuration of the remote control system 1, please see FIG. 9.

First, the control part 31 of the remote control apparatus 30 performs the same operation steps as steps S101 and S102 in FIG. 2 of the first example embodiment (steps S101 and S102 in FIG. 10).

Next, the control part 31 (the communication delay time estimation processing part 35a) of the remote control apparatus 30 estimates a future communication delay time based on the communication delay time (a round-trip delay time may be used) measured in step S102. (Step S401).

Figure 11:
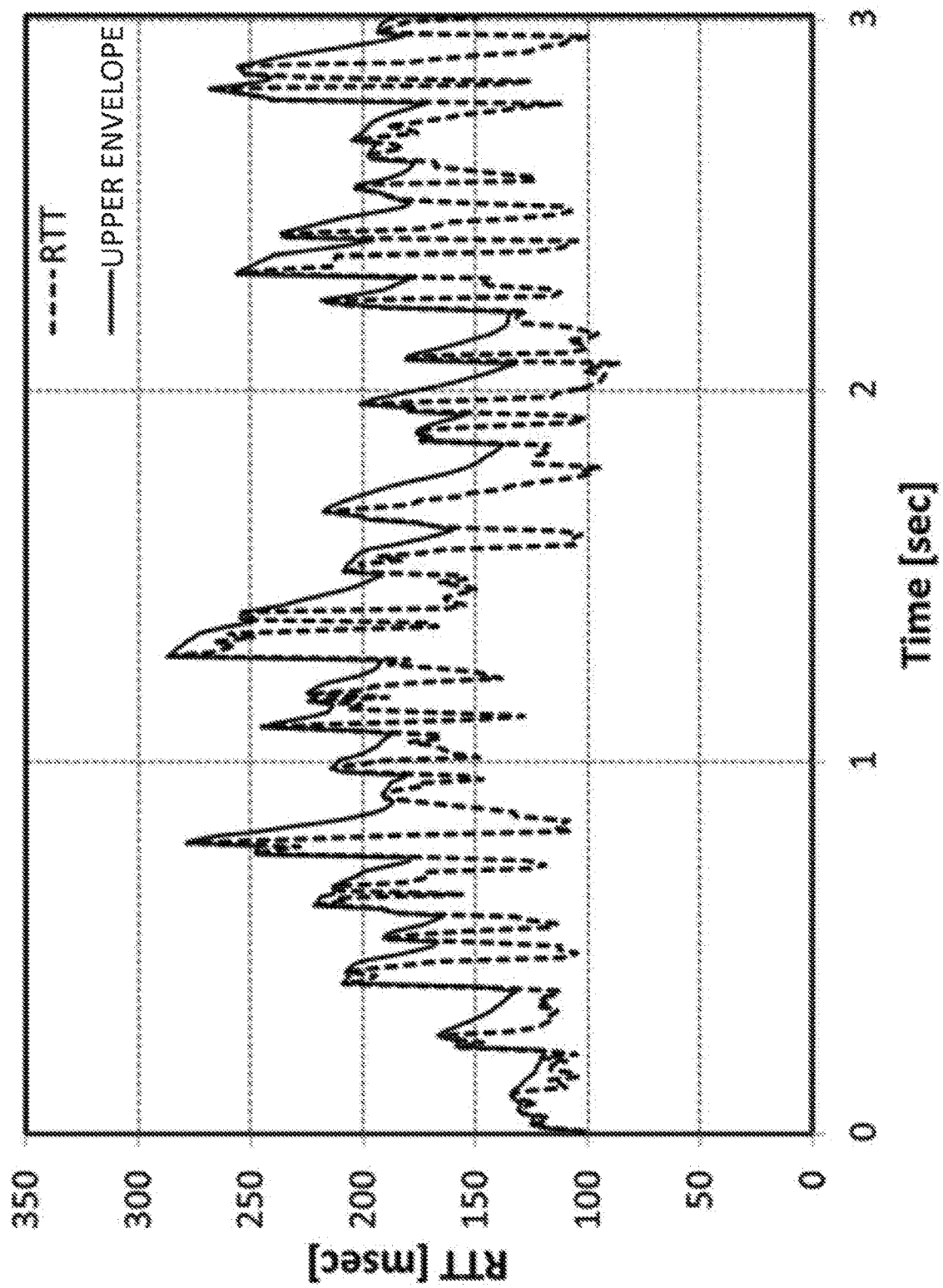
FIG. 11 is a graph exemplarily illustrating an estimation result of a communication delay time by a communication delay time estimation processing part of the remote control apparatus in the remote control system according to the third example embodiment.

Here, a method of estimating the future communication delay time will be explained with reference to drawings. FIG. 11 is a graph exemplarily illustrating a communication delay time estimation result by the communication delay time estimation processing part of the remote control apparatus in the remote control system according to the third example embodiment.

When estimating the future communication delay time, the communication delay time estimation processing part 35a calculates an upper envelope (see the upper envelope of FIG. 11) of fluctuation of the communication delay time based on the communication delay time (a round trip time may be used; RTT (Round Trip Time) in FIG. 11) measured by the communication delay time measurement processing part 31b; and estimates the future communication delay time by using the calculated value of the upper envelope. That is, it is regarded that a communication delay time equivalent to the value of the upper envelope calculated by the communication delay time estimation processing part 35a occurs in the next communication. The upper envelope can be calculated by performing a smoothing process (an averaging process may be used) on the measured communication delay time.

For example, the communication delay time estimation processing part 35a can obtain an estimated value of the future round-trip delay time estimated at the time (t) in Formula 4 based on an estimated value of the future round-trip delay time estimated at the time (t−1) and a measured value of the round-trip delay time measured at the time (t).

Here, "the estimated value of the future round-trip delay time estimated at the time (t−1)", "the measured value of the round-trip delay time measured at the time (t)", and "the estimated value of the future round-trip delay time estimated at the time (t)" in Formula 4 are defined as follows.

The estimated value of the future round-trip delay time estimated at the time (t−1)=d̂(t−1)

The measured value of the round-trip delay time measured at the time (t)=d(t)

The estimated value of the future round-trip delay time estimated at the time (t)=d̂(t)

$$\hat{d}(t) = \begin{cases} \alpha \cdot \hat{d}(t-1) + (1-\alpha) \cdot d(t) & (\hat{d}(t-1) > d(t)) \\ d(t) & (\text{otherwise}) \end{cases} \quad \text{[Formula 4]}$$

Here, α in Formula 4 is a weighting coefficient, and the weighting coefficient is a parameter that gives a higher priority to the measured value of the round-trip delay time measured at the time (t) as the value is smaller. The weight coefficient α takes a value in the range of 0 to 1.

Next, the control part 31 (the overshoot region estimation processing part 31c) of the remote control apparatus 30 estimates the overshoot region based on a size of the control target apparatus 40 stored in the storage part 33 in advance; the moving speed calculated by the path calculation processing part 31a; and the communication delay time estimated by the communication delay time estimation processing part 35a (step S402). The method of estimating (calculating) the overshoot region is the same as that in step S103.

Thereafter, the control part 31 of the remote control apparatus 30 performs the same operation steps as steps S104, S105 or S106, and S107 in FIG. 2 of the first example embodiment (S104, S105 or S106, and S107 in FIG. 10), then returns to start.

According to the third example embodiment, the remote control can be continued without impairing safety even if a communication delay or its fluctuation occurs in the communication network 10 as the first example embodiment, and it can contribute to the improvement of the security in the remote control system 1.

Also, according to the third example embodiment, the communication delay time according to the future communication between the remote control apparatus 30 and the control target apparatus 40 is estimated, and the overshoot region is estimated in consideration of the estimated communication delay time. That is, in consideration of the distance at which the control target apparatus 40 goes too far due to the influence of the communication delay time, the remote control apparatus 30 predicts the contact between the control target apparatus 40 and the peripheral object(s), and changes the moving direction of the control target apparatus 40 when predicting the contact. Thereby, since collision with peripheral objects can be avoided, it can contribute to the improvement of the safety in the remote control system 1.

FOURTH EXAMPLE EMBODIMENT

Figure 12:
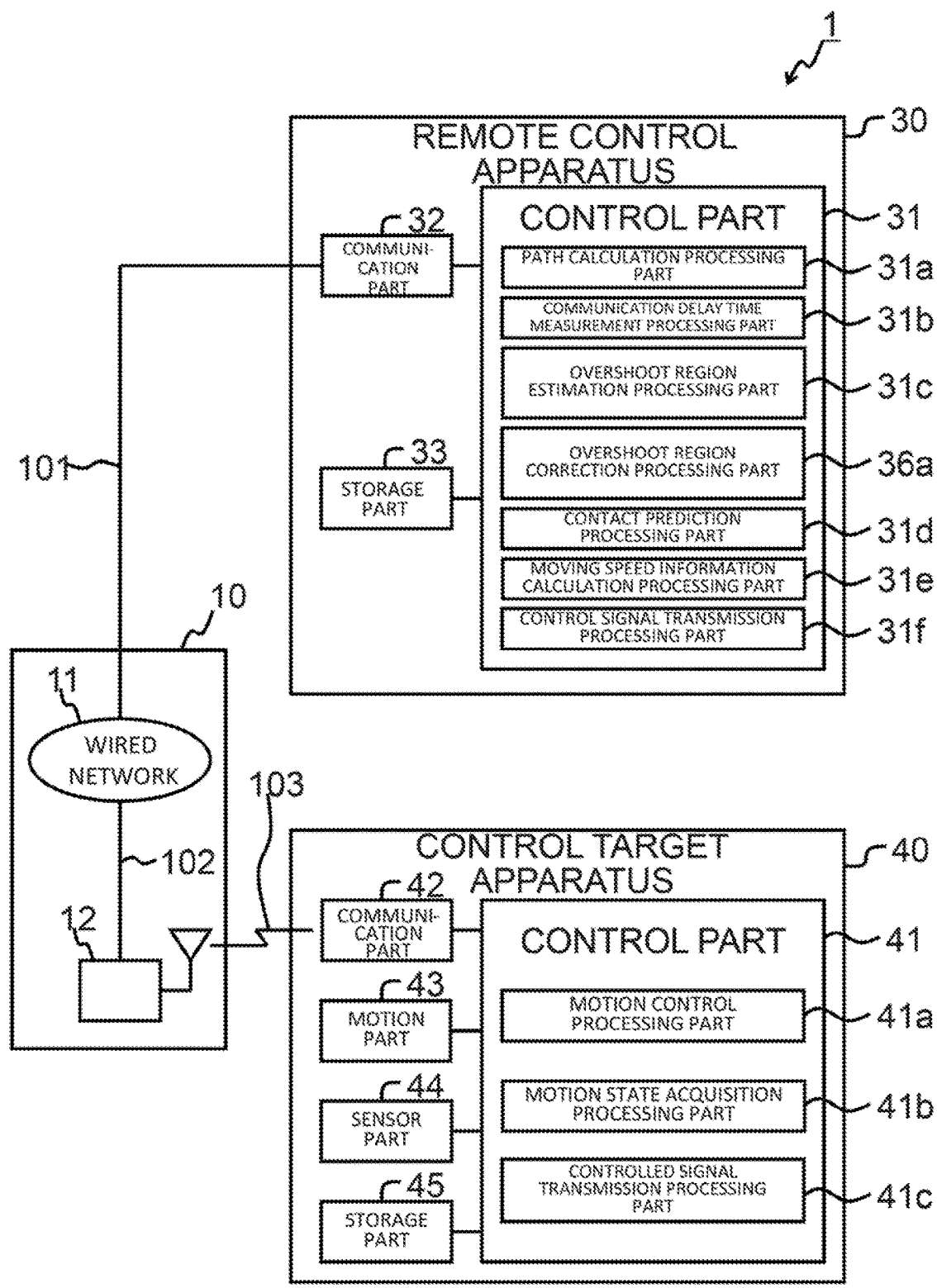
FIG. 12 is a block diagram schematically illustrating an example of a configuration of a remote control system according to a fourth example embodiment.

A remote control system according to a fourth example embodiment will be explained with reference to drawings. FIG. 12 is a block diagram schematically illustrating an example of a configuration of the remote control system according to the fourth example embodiment.

The configuration of the remote control system 1 according to the fourth example embodiment differs from the first example embodiment in that an overshoot region correction processing part 36*a* is newly provided in the configuration of the control part 31 of the remote control apparatus 30.

The overshoot region correction processing part 36*a* corrects the overshoot region estimated by the overshoot region estimation processing part 31*c* based on the path of the control target apparatus 40 travelled in the past. A method of correcting the estimated overshoot region will be explained later.

Other configuration of the fourth example embodiment are the same as those of the first example embodiment. Also, the example embodiment 4 may be appropriately combined with the example embodiments 2 and 3.

Figure 13:
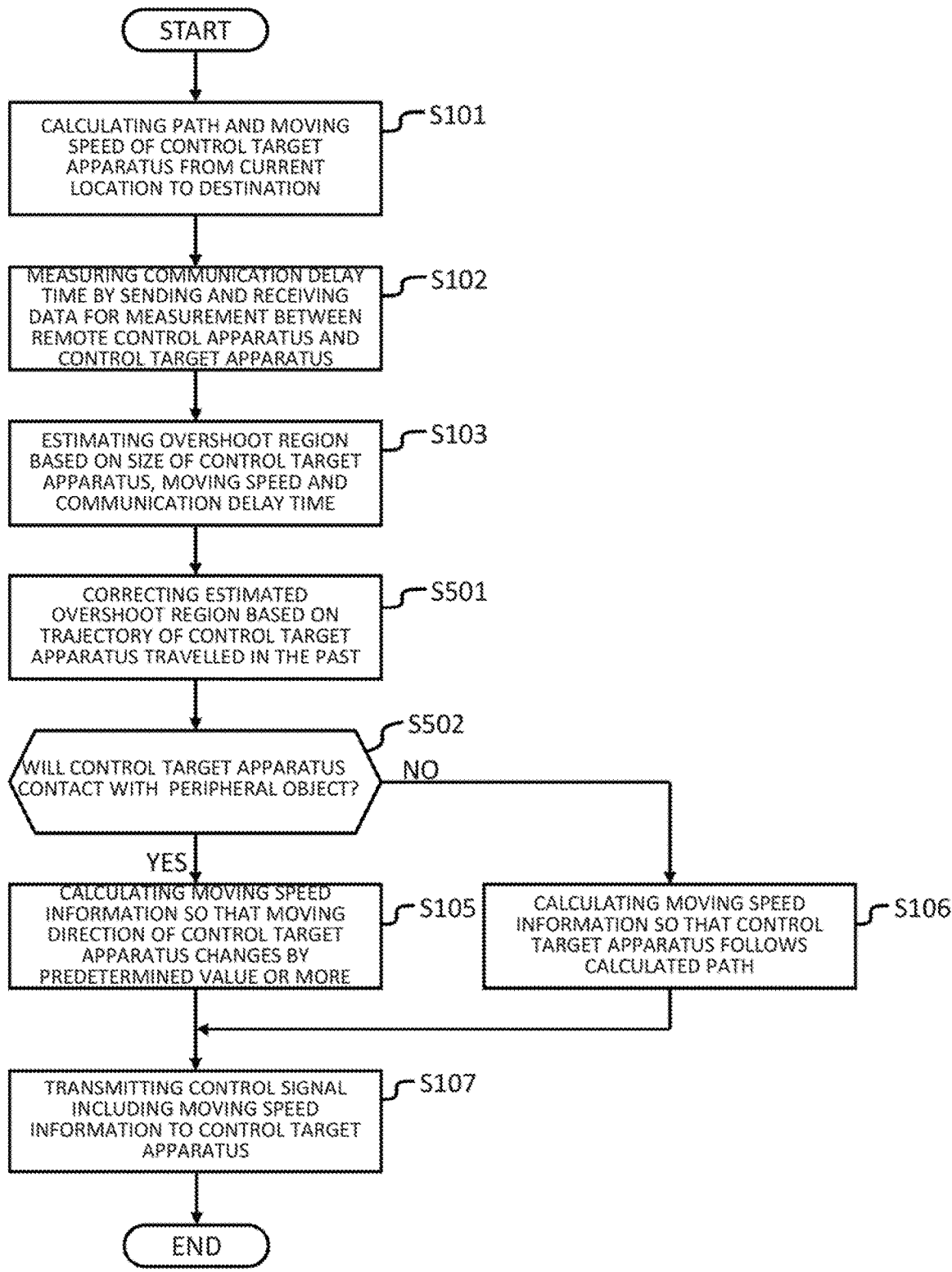
FIG. 13 is a flowchart schematically illustrating an example of operations of a control part of the remote control apparatus in the remote control system according to the fourth example embodiment.

Next, operations of the control part of the remote control apparatus in the remote control system according to the fourth example embodiment will be explained with reference to drawings. FIG. 13 is a flowchart schematically illustrating operations of the control part of the remote control apparatus in the remote control system according to the fourth example embodiment. As to the configuration of the remote control system 1, please see FIG. 12.

First, the control part 31 of the remote control apparatus 30 performs the same operation steps as steps S101 to S103 in FIG. 2 of the first example embodiment (steps S101 to S103 of FIG. 13).

Next, the control part 31 (the overshoot region correction processing part 36*a*) of the remote control apparatus 30 corrects the estimated overshoot region based on a path of the control target apparatus 40 travelled in the past (Step S501).

Figure 14A:
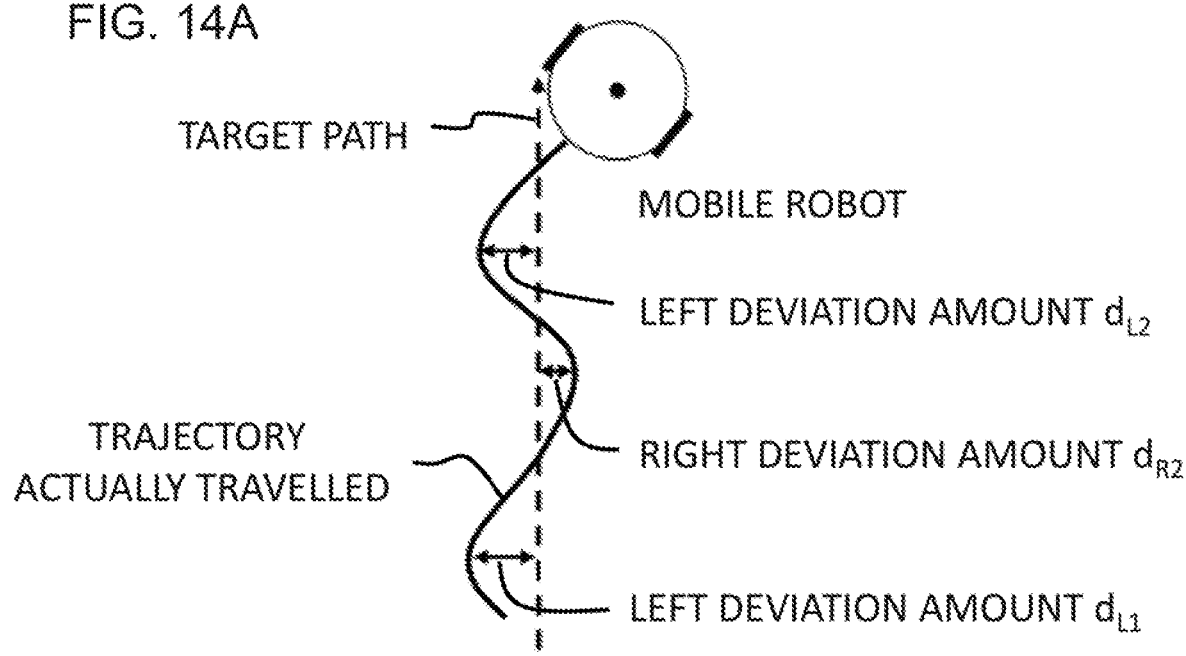
FIG. 14 is a schematic diagram illustrating an example of a correction result of an overshoot region by an overshoot region correction processing part of the remote control apparatus in the remote control system according to the fourth example embodiment.
Figure 14B:
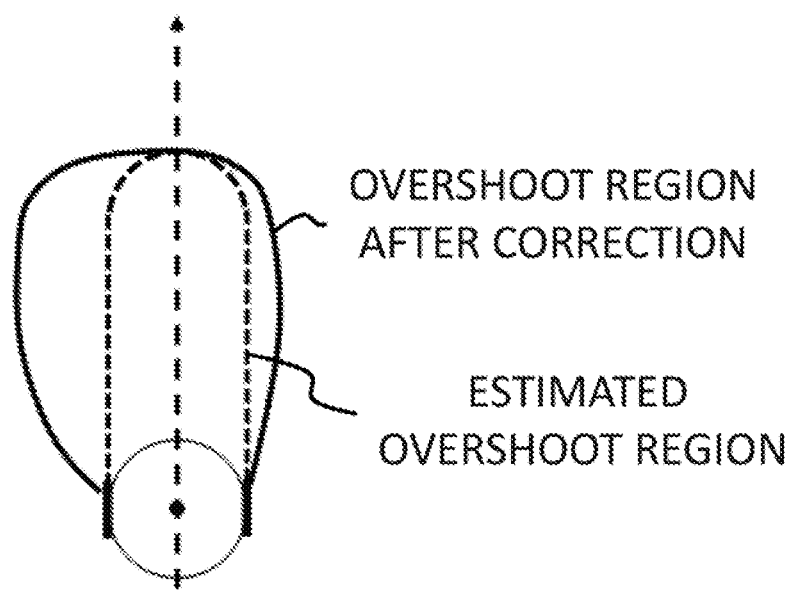

Here, a method of correcting the estimated overshoot region will be explained with reference to drawings. FIGS. 14A and 14B are schematic diagrams illustrating an example of an overshoot region correction result by the overshoot region correction processing part 36*a* of the remote control apparatus in the remote control system according to the fourth example embodiment. The overshoot region correction processing part 36*a* calculates each of shift amounts $d_{L1}$, $d_{R1}$, and $d_{L2}$ of left and/or right sides with respect to the travelling direction by using a trajectory of the control target apparatus 40 travelled in the past (see FIG. 14A). Then, the overshoot region correction processing part 36*a* corrects the estimated overshoot region so that the estimated overshoot region is expanded to the left and/or right sides as each of the shift amounts $d_{L1}$, $d_{R1}$, and $d_{L2}$ of the left and/or right sides increases (see FIG. 14B). Here, the correction amount on the left side of the overshoot region may be set to a maximum value of the shift amounts $d_{L1}$ and $d_{L2}$ of the left side with respect to the travelling direction within a predetermined period, and the correction amount on the right side of the overshoot region may be set to a maximum value of the shift amount $d_{R1}$ of the right side with respect to the travelling direction within the predetermined period.

Next, the control part 31 (the contact prediction processing part 31*d*) of the remote control apparatus 30 predicts whether or not the control target apparatus 40 will contact with the peripheral object(s) based on the overshoot region corrected in step S501, and the peripheral object information of the control target apparatus 40 stored in the storage part 33 in advance (Step S502).

When it is predicted that there is a contact (step S502: YES), the control part 31 of the remote control apparatus 30 performs the same operation steps as steps S105 and S107 in FIG. 2 of the first example embodiment (steps S105 and S107 in FIG. 13), then returns to start.

On the other hand, when it is predicted that there is no contact (step S502: NO), the control part 31 of the remote control apparatus 30 performs the same operation steps as steps S106 and S107 in FIG. 2 of the first example embodiment (steps S106 and S107 in FIG. 13), and then return to the start.

According to the fourth example embodiment, the remote control can be continued without impairing safety even if a communication delay or its fluctuation occurs in the communication network 10 as the first example embodiment, and it can contribute to the improvement of the safety in the remote control system 1.

Also, according to the fourth example embodiment, the remote control apparatus 30 remotely controls the control target apparatus 40 while correcting the estimated overshoot region by using the trajectory of the control target apparatus 40 travelled in the past. That is, in consideration of the influence of the road surface condition (unevenness and inclination of the road surface, etc.) and the influence of individual differences in motion of the motion part 43 (the left and/or right wheels) of the control target apparatus 40, a contact between the control target apparatus 40 and the peripheral object(s) can be predicted. As a result, since the collision with the peripheral object(s) can be avoided by changing the moving direction of the control target apparatus 40 when it is predicted that a contact will occur, it can contribute to the improvement of the safety in the remote control system 1.

FIFTH EXAMPLE EMBODIMENT

Figure 15:
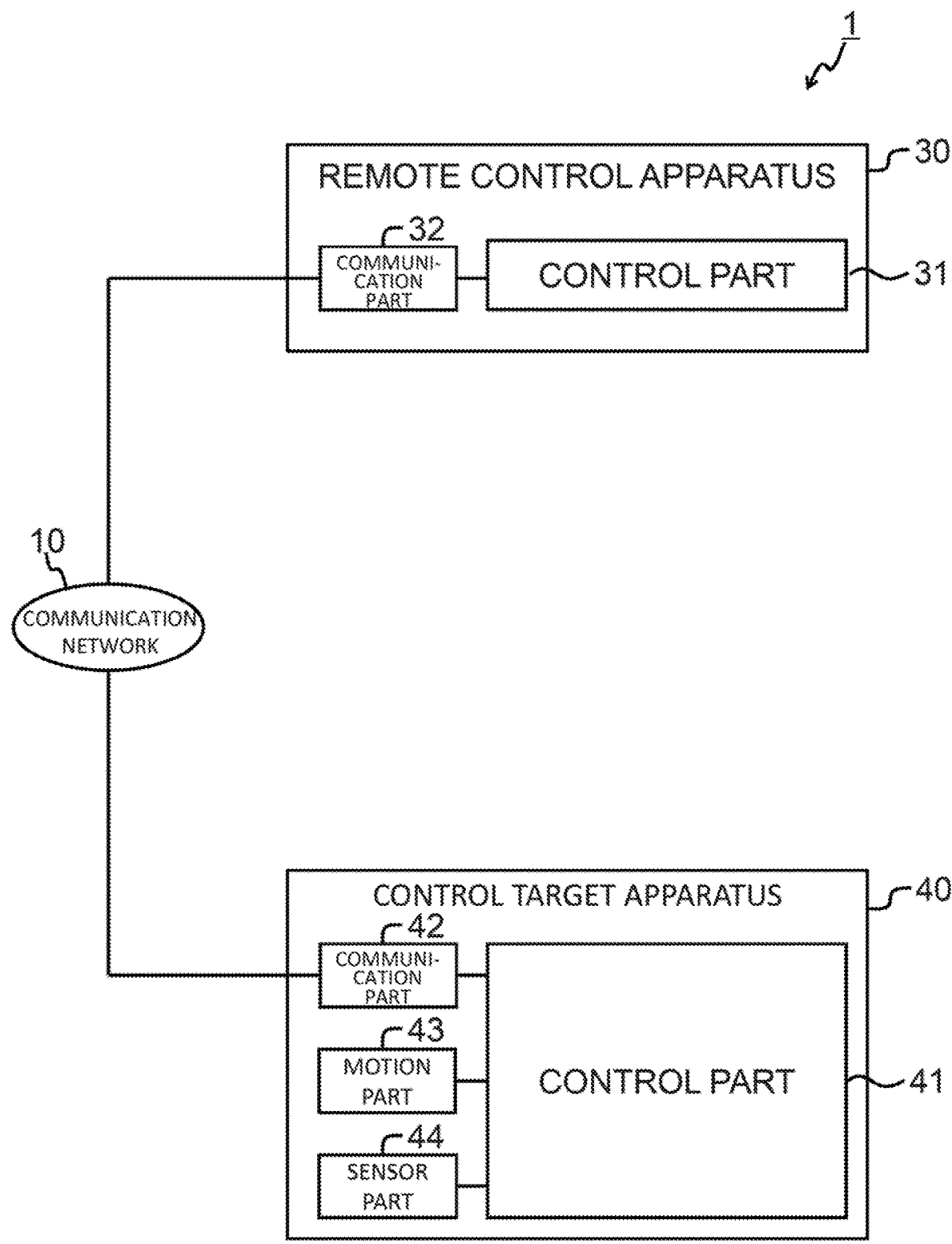
FIG. 15 is a block diagram schematically illustrating an example of a configuration of a remote control system according to a fifth example embodiment.

A remote control system according to a fifth example embodiment will be explained with reference to drawings. FIG. 15 is a block diagram schematically illustrating an example of a configuration of a remote control system according to the fifth example embodiment.

The remote control system 1 is a system that remotely controls motions of a control target apparatus 40 located at a remote place from a remote control apparatus 30 via a communication network 10. The remote control system 1 comprises the communication network 10, the remote control apparatus 30, and the control target apparatus 40.

The communication network 10 is an information communication network that communicatably connects the remote control apparatus 30 and the control target apparatus 40.

The remote control apparatus 30 is an apparatus that remotely controls the control target apparatus 40 via the communication network 10. The remote control apparatus 30 comprises: a communication part 32 that transmits and receives predetermined data to and from the control target apparatus 40; and a control part 31 configured to remotely control the control target apparatus 40 through the communication part 32.

The control part 31 performs a process of calculating a path and a moving speed for reaching a desired destination from a current position of the control target apparatus 40. The control part 31 performs a process of measuring a communication delay time between the remote control apparatus 30 and the control target apparatus 40. The control part 31 performs a process of estimating an overshoot region based on the measured communication delay time; a size of the control target apparatus 40 stored in advance, and the calculated moving speed. The control part 31 performs a process of predicting whether or not the control target apparatus will contact with the peripheral object(s) based on the calculated path, the estimated overshoot region, and the stored peripheral object information of the control target apparatus 40. When it is predicted that the contact will occur, the control part 31 performs a process of calculating a moving speed information to be given to the control target apparatus 40 so that a moving direction of the control target apparatus 40 changes by a predetermined value or more. The control part 31 performs a process of transmitting a control signal including the calculated moving speed information to the control target apparatus 40.

The control target apparatus 40 is an apparatus that is remotely controlled from the remote control apparatus 30 via the communication network 10. The control target apparatus 40 comprises: a communication part 42 that transmits and receives predetermined data to and from the remote control apparatus 30; a motion part 43 that performs a predetermined motion; a sensor part 44 that measures a motion state of the control target apparatus 40; and a control part 41 that controls the motion part 43.

The control part 41 performs a process of controlling motions of the motion part 43 by using the control signal received from the remote control apparatus 30. The control part 41 performs a process of acquiring a motion state measured by the sensor part 44. The control part 41 performs a process of transmitting a controlled signal including a motion state to the remote control apparatus 30.

Figure 16:
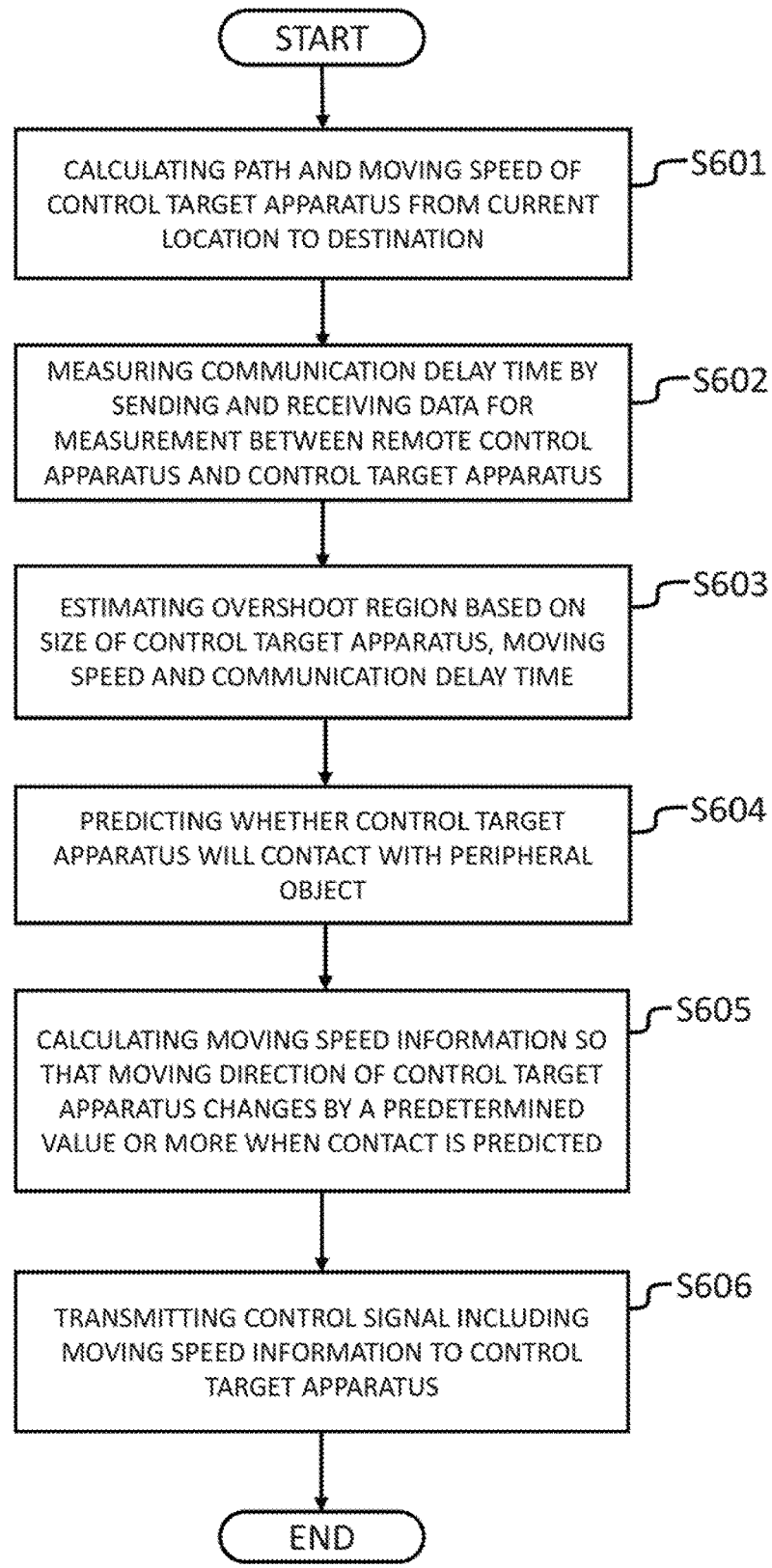
FIG. 16 is a flowchart schematically illustrating an example of operations of a control part of the remote control apparatus in the remote control system according to the fifth example embodiment.

Next, operations of the control part of the remote control apparatus in the remote control system according to the fifth example embodiment will be explained with reference to drawings. FIG. 16 is a flowchart schematically illustrating an example of operations of the control part of the remote control apparatus in the remote control system according to the fifth example embodiment.

First, the control part 31 of the remote control apparatus 30 calculates a path and a moving speed for reaching a desired destination from a current location of the control target apparatus 40 (step S601).

Next, the control part 31 of the remote control apparatus 30 measures a communication delay time between the remote control apparatus 30 and the control target apparatus 40 (step S602).

Next, the control part 31 of the remote control apparatus 30 estimates an overshoot region based on: the measured communication delay time; a stored size of the control target apparatus 40; and the calculated moving speed (Step S603).

Next, the control part 31 of the remote control apparatus 30 predicts whether or not the control target apparatus 40 will contact with the peripheral object(s) based on: the calculated path; the estimated overshoot region; and the stored peripheral object information of the control target apparatus 40 (step S604).

When it is predicted that the contact will occur, the control part of the remote control apparatus 30 calculates moving speed information to be given to the control target apparatus 40 so that the moving direction of the control target apparatus changes by a predetermined value or more (step S605).

Finally, the control part 31 of the remote control apparatus 30 transmits a control signal including the calculated moving speed information to the control target apparatus 40 (step S606), then comes to end.

When it is predicted that no contact will occur, the moving speed calculated in step S601 can be included in the control signal as moving speed information and transmitted to the control target apparatus 40.

According to the fifth example embodiment, when it is predicted that the control target apparatus 40 will contact with the peripheral object(s), the moving direction of the control target apparatus 40 is changed, whereby even if a communication delay or a variation thereof occurs in the communication network 10, a remote control can be continued without impairing safety, and it can contribute to the improvement of the safety in the remote control system 1.

Figure 17:
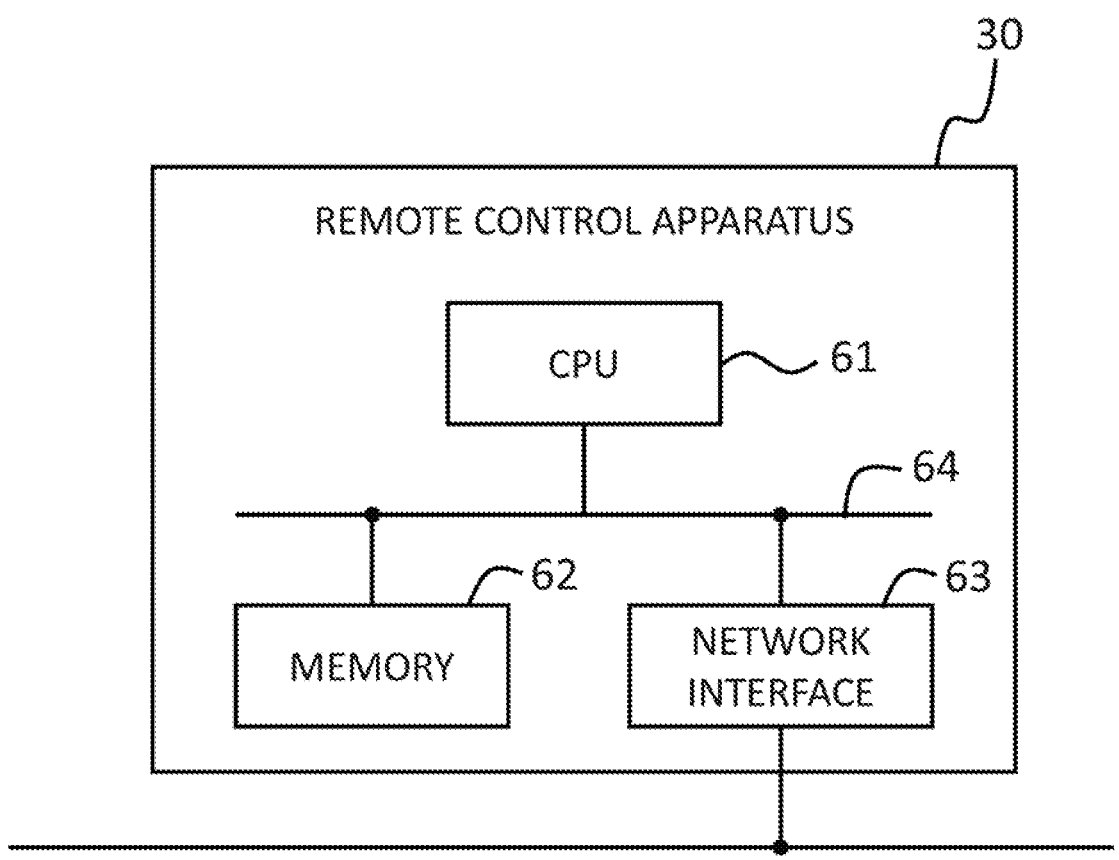
FIG. 17 is a block diagram illustrating an example of a hardware configuration of a remote control apparatus.

The remote control apparatus 30 according to the first to fifth example embodiments can be configured by a so-called information processing apparatus (computer), and an apparatus having a configuration illustrated in FIG. 17 can be used. For example, the remote control apparatus 30 comprises a CPU (Central Processing part) 61, a memory 62, a network interface 63, and the like, which are mutually connected by an internal bus 64.

The configuration illustrated in FIG. 17 is not intended to limit a hardware configuration of the remote control apparatus 30. The remote control apparatus 30 may include a hardware not shown (for example, an input/output interface). Alternatively, the number of units such as the CPU 61 included in the remote control apparatus 30 is not limited to the example illustrated in FIG. 17, for example, a plurality of CPUs 61 may be included in the remote control apparatus 30.

As the memory 62, for example, a RAM (Random Access Memory), a ROM (Read Only Memory), an auxiliary storage apparatus (such as a hard disk), or the like can be used.

As the network interface 63, for example, a LAN (Local Area Network) card, a network adapter, a network interface card, or the like can be used.

Functions of the remote control apparatus 30 is realized by the above processing module. The processing module is realized, for example, by the CPU 61 executing a program stored in the memory 62. Also, the program can be downloaded via a network or updated by using a storage medium storing the program. Further, the processing module may be realized by a semiconductor chip. That is, the functions performed by the processing module may be realized by executing software on some hardware.

APPENDIX

In the present invention, a mode of the remote control apparatus according to the first aspect is possible.

In the remote control apparatus according to the first aspect, the control part is configured to perform: calculating the path connecting between a current position and a desired destination based on a position information and direction information as the current position of the control target apparatus included in a latest controlled signal acquired from the control target apparatus, and the desired destination given in advance, upon calculating the path and the moving speed; and calculating a moving speed such that the control target apparatus follows the calculated path.

In the remote control apparatus according to the first aspect, the control part is configured to perform measuring the communication delay time by transmitting and receiving data for measurement for measuring the communication delay time to and from the control target apparatus, upon measuring the communication delay time.

In the remote control apparatus according to the first aspect, the control part is configured to perform estimating the control target apparatus will contact with a peripheral object(s) when the estimated overshoot region at least partially overlaps a position of the peripheral object(s) according to the peripheral object information, or when a closest distance between the estimated overshoot region and the position of the peripheral object(s) according to the peripheral object information is less than a predetermined value, upon estimating whether or not the control target apparatus will contact with a peripheral object(s).

In the remote control apparatus according to the first aspect, the control part is configured to perform calculating the moving speed information so as to cause the control target apparatus to perform a turning motion on a spot, or to perform a circular motion having an arbitrary curvature, upon calculating the moving speed information.

In the remote control apparatus according to the first aspect, the peripheral object information is map information including position(s) of the peripheral object(s), which is stored in advance.

In the remote control apparatus according to the first aspect, the control part is configured to perform updating the stored peripheral object information based on state information included in a latest controlled signal acquired from the control target apparatus or a monitoring camera for monitoring the control target apparatus.

In the remote control apparatus according to the first aspect, the control part is configured to perform updating the stored peripheral object information, when the state information included in a latest controlled signal acquired from the control target apparatus is a distance between the control target apparatus and the peripheral object(s), upon updating the peripheral object information, by using the distance as the peripheral object information.

In the remote control apparatus according to the first aspect, the control part is configured to perform:
calculating a distance from the control target apparatus to the peripheral object(s), when the state information included in a latest controlled signal acquired from the control target apparatus is an image of a peripheral object(s) captured by the control target apparatus, upon updating the peripheral object information, based on parallax of the image, by using a predetermined image processing technology; and updating the stored peripheral object information, by using the calculated distance as the peripheral object information.

In the remote control apparatus according to the first aspect, the control part is configured to perform: detecting respective positions of the control target apparatus and the peripheral object(s), when the state information included in a latest controlled signal acquired from the control target apparatus is an image captured by a monitoring camera, upon updating the peripheral object information, based on the image, by using a predetermined image processing technology; calculating a distance from the control target apparatus to the peripheral object(s) based on the detected position; and updating the stored peripheral object information, by using the calculated distance as the peripheral object information.

In the remote control apparatus according to the first aspect, the control part is configured to perform: estimating a future communication delay time based on the measured communication delay time; and estimating the overshoot region by using the estimated future communication delay time instead of the measured communication delay time, upon estimating the overshoot region.

In the remote control apparatus according to the first aspect, the control part is configured to perform: calculating an upper envelope of fluctuation of the communication delay time, based on the measured communication delay time, upon estimating the future communication delay time; and estimating the future communication delay time by using a value of the calculated upper envelope.

In the remote control apparatus according to the first aspect, the control part is configured to perform: calculating left or right deviation amount relative to a current travelling direction, based on a trajectory that the control target apparatus has travelled in the past; correcting the estimated overshoot region so as to spread to the left or right as the deviation amount increases; and predicting whether or not the control target apparatus will contact with the peripheral object(s), by using the corrected overshoot region instead of the estimated overshoot region, upon predicting whether or not the contact will occur.

In the present invention, a mode of the remote control system according to the second aspect is possible.

In the remote control system according to the second aspect, the control target apparatus further comprises a stereo camera capable of capturing a peripheral object(s) of the control target apparatus, and the control part of the control target apparatus is configured to acquire an image captured as a motion state by the stereo camera, upon acquiring the motion state.

In the remote control system according to the second aspect, the remote control system further comprising a monitoring camera for monitoring an area where the control target apparatus moves; and the monitoring camera is configured to perform transmitting a controlled signal including an image of the area to the remote control apparatus.

In the present invention, a mode of the remote control method according to the third aspect is possible.

In the present invention, a mode of a remote control program according to the fourth aspect is possible.

The disclosures of the above Patent Literatures are incorporated herein by reference. Within the ambit of the entire disclosure of the present invention (including the claims and the drawings), modifications and adjustments of the example embodiments or examples are possible further based on the basic technical concept. Also, various combinations or selections (non-selections if necessary) of various disclosed elements (including each element of each claim, each element of each example embodiment or example, each element of each drawing, and the like) are possible within the ambit of the entire disclosure of the present invention. That is, the present invention naturally includes various variations and modifications that can be made by one skilled in the art according to the entire disclosure including the claims and the drawings and the technical idea. Further, as to the numerical values and the numerical ranges stated in the present application, any intermediate value, lower numerical value, and small sub-range(s) are considered to be stated even if not explicitly mentioned.

REFERENCE SIGNS LIST

1 Remote control system
10 Communication network
11 Wired network
12 Wireless base station apparatus
30 Remote control apparatus
31 Control part
31a Path calculation processing part
31b Communication delay time measurement processing part
31c Overshoot region estimation processing part
31d Contact prediction processing part
31e Moving speed information calculation processing part
31f Control signal transmission processing part
32 Communication part
33 Storage part
34a Peripheral object information update processing part
35a Communication delay time estimation processing part
36a Overshoot region correction processing part
40 Control target apparatus
41 Control part
41a Motion control processing part
41b Motion state acquisition processing part
41c Controlled signal transmission processing part
42 Communication part
43 Motion part
44 Sensor part
45 Storage part
46 Stereo camera
50 Monitoring camera
61 CPU
62 Memory
63 Network interface
64 Internal bus
101, 102 Wired link
103 Wireless link

The invention claimed is:

1. A remote control apparatus that remotely controls a control target apparatus via a communication network, comprising:
a network interface configured to transmit and receive predetermined data to and from the control target apparatus; and
a central processing part (CPU) configured to remotely control the control target apparatus through the network interface,
wherein the CPU is configured to perform:
calculating a path and a moving speed to reach a destination from a current position of the control target apparatus;
measuring a communication delay time between the remote control apparatus and the control target apparatus;
estimating an overshoot region based on the measured communication delay time, a stored size of the control target apparatus, and the calculated moving speed;
predicting whether or not the control target apparatus will contact with at least one peripheral object, based on the calculated path, the estimated overshoot region and stored peripheral object information of the control target apparatus;
calculating moving speed information to be given to the control target apparatus so that a moving direction of the control target apparatus changes by a predetermined value or more when predicted that the control target apparatus will contact with the at least one peripheral object; and
transmitting a control signal including the calculated moving speed information to the control target apparatus.

2. The remote control apparatus according to claim 1, wherein the CPU is configured to perform:
calculating a path connecting between the current position and the destination based on position information and direction information as the current position of the control target apparatus included in a latest controlled signal acquired from the control target apparatus, and the destination given in advance, upon calculating the path and the moving speed; and
calculating the moving speed such that the control target apparatus follows the calculated path.

3. The remote control apparatus according to claim 1, wherein the CPU is configured to perform measuring the communication delay time by transmitting and receiving data for measurement for measuring the communication delay time to and from the control target apparatus.

4. The remote control apparatus according to claim 1, wherein the CPU is configured to perform estimating the control target apparatus will contact with the at least one peripheral object when the estimated overshoot region at least partially overlaps a position of the at least one peripheral object according to the peripheral object information, or when a closest distance between the estimated overshoot region and the position of the at least one peripheral object according to the peripheral object information is less than a predetermined value.

5. The remote control apparatus according to claim 1, wherein the CPU is configured to perform calculating the moving speed information so as to cause the control target apparatus to perform a turning motion on a spot, or to perform a circular motion having an arbitrary curvature.

6. The remote control apparatus according to claim 1, wherein the CPU is configured to perform:
calculating a left or right deviation amount relative to a current travelling direction, based on a trajectory that the control target apparatus has travelled in the past;
correcting the estimated overshoot region so as to spread to the left or right as the deviation amount increases; and
predicting whether or not the control target apparatus will contact with the at least one peripheral object, by using the corrected overshoot region instead of the estimated overshoot region.

7. The remote control apparatus according to claim 1, wherein the CPU is configured to perform:
estimating a future communication delay time based on the measured communication delay time; and
estimating the overshoot region by using the estimated future communication delay time instead of the measured communication delay time.

8. The remote control apparatus according to claim 7, wherein the CPU is configured to perform:
calculating an upper envelope of fluctuation of the communication delay time, based on the measured communication delay time; and
estimating the future communication delay time by using a value of the calculated upper envelope.

9. The remote control apparatus according to claim 1, wherein the peripheral object information is map information including position information of the at least one peripheral object, and the peripheral object information is stored in advance.

10. The remote control apparatus according to claim 9, wherein the CPU is configured to perform updating the stored peripheral object information based on state information included in a latest controlled signal acquired from the control target apparatus or a monitoring camera for monitoring the control target apparatus.

11. The remote control apparatus according to claim 10, wherein the CPU is configured to perform updating the stored peripheral object information, when the state information included in a latest controlled signal acquired from the control target apparatus is a distance between the control target apparatus and the at least one peripheral object, by using the distance as the peripheral object information.

12. The remote control apparatus according to claim 10, wherein the CPU is configured to perform:
calculating a distance from the control target apparatus to the at least one peripheral object, when the state information included in a latest controlled signal acquired from the control target apparatus is an image of the at least one peripheral object captured by the control target apparatus, based on parallax of the image, by using a predetermined image processing technology; and
updating the stored peripheral object information, by using the calculated distance as the peripheral object information.

13. The remote control apparatus according to claim 10, wherein the CPU is configured to perform:
detecting respective positions of the control target apparatus and the at least one peripheral object, when the state information included in a latest controlled signal acquired from the control target apparatus is an image captured by a monitoring camera, based on images at different times, by using a predetermined image processing technology;
calculating a distance from the control target apparatus to the at least one peripheral object based on the detected position; and
updating the stored peripheral object information, by using the calculated distance as the peripheral object information.

14. A remote control method performed by using a remote control apparatus that remotely controls a control target apparatus via a communication network, comprising:
calculating a path and a moving speed to reach a destination from a current position of the control target apparatus;
measuring a communication delay time between the remote control apparatus and the control target apparatus;
estimating an overshoot region based on the measured communication delay time, a stored size of the control target apparatus, and the calculated moving speed;
predicting whether or not the control target apparatus will contact with at least one peripheral object, based on the calculated path, the estimated overshoot region, and stored peripheral object information of the control target apparatus;
calculating moving speed information to be given to the control target apparatus so that a moving direction of the control target apparatus changes by a predetermined value or more when predicted that the control target apparatus will contact with the at least one peripheral object; and
transmitting a control signal including the calculated moving speed information to the control target apparatus.

15. A non-transient computer readable recording medium storing a remote control program that causes to execute remote control of a control target apparatus by a remote control apparatus, wherein the program is configured to execute:
calculating a path and a moving speed to reach a destination from a current position of the control target apparatus;
measuring a communication delay time between the remote control apparatus and the control target apparatus;
estimating an overshoot region based on the measured communication delay time, a stored size of the control target apparatus, and the calculated moving speed;
predicting whether or not the control target apparatus will contact with at least one peripheral object, based on the calculated path, the estimated overshoot region, and stored peripheral object information of the control target apparatus;
calculating moving speed information to be given to the control target apparatus so that a moving direction of the control target apparatus changes by a predetermined value or more when predicted that the control target apparatus will contact with the at least one peripheral object; and
transmitting a control signal including the calculated moving speed information to the control target apparatus.

16. The remote control method according to claim 14, further comprising:
calculating a path connecting between the current position and the destination based on position information and direction information as the current position of the control target apparatus included in a latest controlled signal acquired from the control target apparatus, and the destination given in advance; and
calculating the moving speed such that the control target apparatus follows the calculated path.

17. The remote control method according to claim 14, further comprising measuring the communication delay time by transmitting and receiving data for measurement for measuring the communication delay time to and from the control target apparatus.

18. The remote control method according to claim 14, further comprising estimating the control target apparatus will contact with the at least one peripheral object when the estimated overshoot region at least partially overlaps a position of the at least one peripheral object according to the peripheral object information, or when a closest distance between the estimated overshoot region and the position of the at least one peripheral object according to the peripheral object information is less than a predetermined value.

19. The remote control method according to claim 14, further comprising calculating the moving speed information so as to cause the control target apparatus to perform a turning motion on a spot, or to perform a circular motion having an arbitrary curvature.

20. The remote control method according to claim 14, wherein the peripheral object information is map information including position information of the at least one peripheral object, and the peripheral object information is stored in advance, and the remote control method further comprises updating the stored peripheral object information based on state information included in a latest controlled signal acquired from the control target apparatus or a monitoring camera for monitoring the control target apparatus.

* * * * *